United States Patent
Weier et al.

(10) Patent No.: US 9,631,115 B2
(45) Date of Patent: *Apr. 25, 2017

(54) COATING COMPOSITION, AND A PROCESS FOR PRODUCING THE SAME

(75) Inventors: Jane E. Weier, Hopewell, NJ (US);
Charles S. Kan, Midland, MI (US);
John A. Roper, III, Midland, MI (US);
Rebecca S. Ortiz, Midland, MI (US);
Timothy J. Young, Bay City, MI (US);
Gary E. Spilman, Midland, MI (US);
Ray E. Drumright, Midland, MI (US)

(73) Assignees: Dow Global Technologies LLC, Midland, MI (US); Rohm and Haas Company, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/009,634

(22) PCT Filed: Apr. 8, 2011

(86) PCT No.: PCT/US2011/031765
§ 371 (c)(1),
(2), (4) Date: Oct. 3, 2013

(87) PCT Pub. No.: WO2012/138348
PCT Pub. Date: Oct. 11, 2012

(65) Prior Publication Data
US 2014/0024742 A1 Jan. 23, 2014

(51) Int. Cl.
*C09D 167/00* (2006.01)
*C09D 167/08* (2006.01)
*C09D 123/00* (2006.01)
*C09D 163/00* (2006.01)

(52) U.S. Cl.
CPC ......... *C09D 167/00* (2013.01); *C09D 123/00* (2013.01); *C09D 163/00* (2013.01); *C09D 167/08* (2013.01)

(58) Field of Classification Search
CPC .......... C08L 23/00–23/36; C08L 67/00; C08L 67/08; C09D 123/00–123/36; C09D 167/00; C09D 167/08; C09J 123/00–123/36; C09J 167/00; C09J 167/08
See application file for complete search history.

(56) References Cited

U.S. PATENT DOCUMENTS

| 6,242,528 | B1 | 6/2001 | Clark et al. |
| 2003/0195292 | A1 | 10/2003 | Kuo et al. |
| 2003/0195294 | A1 | 10/2003 | Kuo et al. |
| 2003/0195305 | A1 | 10/2003 | Kuo et al. |
| 2006/0100316 | A1 | 5/2006 | Cogordan |
| 2007/0027232 | A1 | 2/2007 | Walsh, Jr. et al. |
| 2007/0117922 | A1* | 5/2007 | Kayima et al. ............... 524/599 |

FOREIGN PATENT DOCUMENTS

| GB | 1223033 | 2/1971 |
| WO | 0192378 | 12/2001 |
| WO | WO 0210297 A2 * | 2/2002 |
| WO | 2005059042 | 6/2005 |

OTHER PUBLICATIONS

Halox SZP-391 Data Sheet (2014).*
Imsil Microcrystalline Silica Fillers Technical Data Sheet (1997).*
Dupont TiPure R-706 Data Sheet (2007).*
Aquamac 440 Data Sheet (2012).*
Ellis et al., Polymers: A Property Database, 2nd ed. (2009).*
EP Office Action dated Jul. 23, 2014; from EP counterpart Application No. 11715639.8.
EP Office Action dated Nov. 29, 2013; from EP counterpart Application No. 11715639.8.
Instructions to EP Office Action dated Mar. 27, 2014; from EP counterpart Application No. 11715639.8.
EP Response to Office Action dated May 6, 2014; from EP counterpart Application No. 11715639.8.

(Continued)

*Primary Examiner* — Kregg Brooks

(57) ABSTRACT

The present invention provides a coating composition, a process for producing the same, one or more coating layers derived therefrom, and articles comprising one or more such coating layers. The coating composition according to the present invention comprises: (a) from 10 to 90 percent by weight of an aqueous, high-solid, solvent-free alkyd dispersion comprising: (i) from 40 to 70 percent by weight of one or more alkyds based on the total weight of the dispersion, wherein each said one or more alkyds has an acid value of less than 20 and a molecular weight (Mn) in the range of greater than 1000 Dalton; (ii) from less than 10 percent by weight of one or more surfactants, based on the total weight of the dispersion; and (iii) from 30 to 55 percent by weight of water, based on the total weight of the dispersion; wherein said aqueous, high-solid, solvent-free alkyd dispersion has an average particle size diameter in the range of from 0.05 to 5 μm; (b) from 10 to 90 one or more second dispersions, one or more second emulsions, or combinations thereof; wherein said coating composition has a solid content of in the range of from 25 to 65 percent by weight of solid content, based on the total weight of the coating composition, and the coating composition has a pH in the range of from 7 to 11, and wherein the coating composition has a volume average particle size in the range of from 0.03 to 5 μm, and wherein the coating composition has a viscosity in the range of from 100 to 10,000 cP.

6 Claims, 2 Drawing Sheets

(56) References Cited

OTHER PUBLICATIONS

English Abstract of EP1980595 published Oct. 15, 2008.
PCT/US2011/031765 International Search Report.
PCT/US2011/031765 Written Opinion.
PCT/US2011/031765 International Preliminary Report on Patentability.
EP Response to Office Action dated Nov. 18, 2014; from EP counterpart Application No. 11715639.8.
Australian Patent Examination Report No. 1 dated Apr. 28, 2015 for counterpart Australian Application No. 2011364953.3, 3 pages.
Chinese First Office Action dated May 28, 2015 for counterpart Chinese Application No. 201180071494.7, 12 pages.
Chinese Office Action dated Feb. 14, 2016; from Chinese counterpart Application No. 201180071494.7.
Chinese Response to Office Action dated Oct. 12, 2015; from Chinese counterpart Application No. 201180071494.7.
Australian Response to Office Action dated Oct. 20, 2015; from Australian counterpart Application No. 2011364953.
Australian Second Office Action dated Nov. 4, 2015; from Australian counterpart Application No. 2011364953.
Australian Response to Office Action dated Feb. 25, 2016; from Australian counterpart Application No. 2011364953.

\* cited by examiner

9D

10D

US 9,631,115 B2

COATING COMPOSITION, AND A PROCESS FOR PRODUCING THE SAME

FIELD OF INVENTION

The present invention relates to a coating composition, a process for producing the same, coating layers derived therefrom, and article comprising such coating layers.

BACKGROUND OF THE INVENTION

Alkyds are a major part of the coatings market. A significant portion of the market is still based on solvent-borne coatings. Waterborne coatings are becoming more important as a solution to the more stringent volatile organic compounds ("VOC") regulations. Currently, water-based alkyds are in the form of either emulsions or water-reducibles (in water miscible solvent). The current water-based alkyds are prepared using low molecular weight resins with either high acid values, for example greater than 50 for neutralization with amines to improve water dispersibility by salt formation, or high levels of emulsifying agents or stabilizers or special functionalization, for example, chemical modification with monomers such as polyglycols or sulfonate-containing compounds.

However, there is still a need for an alkyd dispersion based coating composition, wherein the alkyd dispersion has high solid content, and ultra-low volatile organic compounds, and wherein one or more coating layers derived from such alkyd dispersion based coating compositions possess improved coating properties and performances comparable to those of solvent grade alkyds without the need for the functionalization of the resin and/or non-blended versions. Accordingly, the present invention provides an alkyd dispersion based coating composition, wherein said alkyd dispersion has a high solid content, and ultra-low volatile organic compounds, and wherein the coating composition has improved coating properties and performances comparable to those of solvent grade alkyds without the need for a functionalization of the resin and/or non-blended version.

SUMMARY OF THE INVENTION

The present invention provides a coating composition, a process for producing the same, one or more coating layers derived therefrom, and articles comprising one or more such coating layers.

In one embodiment, the present invention provides a coating composition comprising:
(a) from 10 to 90 percent by weight of an aqueous, high-solid, solvent-free alkyd dispersion comprising: (i) from 40 to 70 percent by weight of one or more alkyds based on the total weight of the dispersion, wherein each said one or more alkyds has an acid value of less than 20 and a molecular weight ($M_n$) in the range of greater than 1000 Dalton; (ii) from less than 10 percent by weight of one or more surfactants, based on the total weight of the dispersion; and (iii) from 30 to 55 percent by weight of water, based on the total weight of the dispersion; wherein said aqueous, high-solid, solvent-free alkyd dispersion has an average particle size diameter in the range of from 0.05 to 5 µm; (b) from 10 to 90 one or more second dispersions, one or more second emulsions, or combinations thereof; wherein said coating composition has a solid content of in the range of from 25 to 65 percent by weight of solid content, based on the total weight of the coating composition, and the coating composition has a pH in the range of from 7 to 11, and wherein the coating composition has a volume average particle size in the range of from 0.03 to 5 µm, and wherein the coating composition has a viscosity in the range of from 100 to 10,000 cP.

In an alternative embodiment, the present invention further provides a method for producing a coating composition comprising the steps of: (1) providing one or more molten or liquid alkyds, wherein each said one or more molten or liquid alkyds has an acid number of less than 20 and a molecular weight ($M_n$) in the range of greater than 1000 Dalton; (2) providing one or more surfactants; (3) providing water; (4) optionally providing one or more neutralizing agents; (5) continuously emulsifying said one or more molten or liquid alkyds in the water in the presence of said one or more surfactants and optionally said one or more neutralizing agents; (6) thereby producing a high internal phase emulsion; (7) providing additional water; (8) contacting said high internal phase emulsion with said additional water; (9) thereby producing said aqueous alkyd dispersion, wherein said alkyd dispersion comprises from 40 to 70 percent by weight of said one or more alkyds, from less than 10 percent by weight of said one or more surfactants, and wherein said dispersion has an average particle size diameter in the range of from 0.05 to 5 µm; (10) providing one or more second dispersions and/or second emulsions; (11) contacting said alkyd dispersion and one or more second dispersion and/or second emulsions; and (12) thereby forming the coating composition.

In an alternative embodiment, the present invention provides one or more coating layers derived from the inventive coating composition, as described herein.

In the alternative embodiment, the present invention provides an article comprising one or more coating layers derived from the inventive coating composition, as described herein.

In an alternative embodiment, the present invention provides a coating composition, process for producing the same, one or more coating layers derived from the inventive coating composition, and an article comprising one or more coating layers derived from the inventive coating composition, in accordance with any of the preceding embodiments, except that the second dispersion is selected from the group consisting of a polyolefin dispersion, a polyurethane dispersion, an epoxy resin dispersion, a polyester dispersion, and combinations thereof.

In an alternative embodiment, the present invention provides a coating composition, process for producing the same, one or more coating layers derived from the inventive coating composition, and an article comprising one or more coating layers derived from the inventive coating composition, in accordance with any of the preceding embodiments, except that the second emulsion is a latex selected from the group consisting of acrylic latex, vinyl acetate acrylic latex, styrene acrylic latex, vinyl acetate ethylene latex, and combinations thereof.

In an alternative embodiment, the present invention provides a coating composition, process for producing the same, one or more coating layers derived from the inventive coating composition, and an article comprising one or more coating layers derived from the inventive coating composition, in accordance with any of the preceding embodiments, except that the coating layer comprises a film having a pendulum hardness in the range of from 50 to 150 seconds, wherein the film has a thickness of at least 40 µm.

In an alternative embodiment, the present invention provides a coating composition, process for producing the same, one or more coating layers derived from the inventive coating composition, and an article comprising one or more coating layers derived from the inventive coating composition, in accordance with any of the preceding embodiments, except that the coating layer comprises a film having a modulus hardness in the range of from $(2*10^7)$ to $(1*10^{11})$ dyn/cm$^2$.

In an alternative embodiment, the present invention provides a coating composition, process for producing the same, one or more coating layers derived from the inventive coating composition, and an article comprising one or more coating layers derived from the inventive coating composition, in accordance with any of the preceding embodiments, except that the coating layer comprises a film having a direct impact resistance in the range of from 65 to 160 inch pounds.

In an alternative embodiment, the present invention provides a coating composition, process for producing the same, one or more coating layers derived from the inventive coating composition, and an article comprising one or more coating layers derived from the inventive coating composition, in accordance with any of the preceding embodiments, except that the coating layer comprises a film having a reverse impact resistance in the range of from 20 to 160 inch pounds.

In an alternative embodiment, the present invention provides a coating composition, process for producing the same, one or more coating layers derived from the inventive coating composition, and an article comprising one or more coating layers derived from the inventive coating composition, in accordance with any of the preceding embodiments, except that the coating layer comprises a film having a gloss loss after QUV at 60° in the range of from less than 30; for example, less than 20, less than 15, less than 10, less than 5, less than 2, or less than 1.

In an alternative embodiment, the present invention provides a coating composition, process for producing the same, one or more coating layers derived from the inventive coating composition, and an article comprising one or more coating layers derived from the inventive coating composition, in accordance with any of the preceding embodiments, except that the coating layer comprises a film having a gloss loss after QUV at 20° in the range of from less than 50; for example, less than 40, less than 30, less than 20, or less than 10.

In an alternative embodiment, the present invention provides a coating composition, process for producing the same, one or more coating layers derived from the inventive coating composition, and an article comprising one or more coating layers derived from the inventive coating composition, in accordance with any of the preceding embodiments, except that the coating layer comprises a film having a ΔE color change after QUV in the range of from less than 8; for example, less than 5, less than 4, or less than 3.

In an alternative embodiment, the present invention provides a coating composition, process for producing the same, one or more coating layers derived from the inventive coating composition, and an article comprising one or more coating layers derived from the inventive coating composition, in accordance with any of the preceding embodiments, except that the one or more alkyds are neutralized up to 100 percent by a neutralizing agent.

In an alternative embodiment, the present invention provides a coating composition, process for producing the same, one or more coating layers derived from the inventive coating composition, and an article comprising one or more coating layers derived from the inventive coating composition, in accordance with any of the preceding embodiments, except that the alkyd dispersion has a viscosity in the range of from 100 to 10,000 cP.

In an alternative embodiment, the present invention provides a coating composition, process for producing the same, one or more coating layers derived from the inventive coating composition, and an article comprising one or more coating layers derived from the inventive coating composition, in accordance with any of the preceding embodiments, except that the one or more alkyds are neutralized up to 200 percent by a neutralizing agent.

In an alternative embodiment, the present invention provides a coating composition, process for producing the same, one or more coating layers derived from the inventive coating composition, and an article comprising one or more coating layers derived from the inventive coating composition, in accordance with any of the preceding embodiments, except that the alkyd dispersion has a solid content of greater than 60 weight percent, based on the weight of the alkyd dispersion.

In an alternative embodiment, the present invention provides a coating composition, process for producing the same, one or more coating layers derived from the inventive coating composition, and an article comprising one or more coating layers derived from the inventive coating composition, in accordance with any of the preceding embodiments, except that the alkyd dispersion has a solid content of greater than 65 weight percent, based on the weight of the alkyd dispersion.

In an alternative embodiment, the present invention provides a coating composition, process for producing the same, one or more coating layers derived from the inventive coating composition, and an article comprising one or more coating layers derived from the inventive coating composition, in accordance with any of the preceding embodiments, except that the alkyd dispersion has a solid content of greater than 70 weight percent, based on the weight of the alkyd dispersion.

In an alternative embodiment, the present invention provides a coating composition, process for producing the same, one or more coating layers derived from the inventive coating composition, and an article comprising one or more coating layers derived from the inventive coating composition, in accordance with any of the preceding embodiments, except that the alkyd resin has an acid number of less than 20.

In an alternative embodiment, the present invention provides a coating composition, process for producing the same, one or more coating layers derived from the inventive coating composition, and an article comprising one or more coating layers derived from the inventive coating composition, in accordance with any of the preceding embodiments, except that the alkyd resin has an acid number of less than 15.

In an alternative embodiment, the present invention provides a coating composition, process for producing the same, one or more coating layers derived from the inventive coating composition, and an article comprising one or more coating layers derived from the inventive coating composition, in accordance with any of the preceding embodiments, except that the alkyd resin has an acid number of less than 10.

In an alternative embodiment, the present invention provides a coating composition, process for producing the same, one or more coating layers derived from the inventive coating composition, and an article comprising one or more coating layers derived from the inventive coating composition, in accordance with any of the preceding embodiments, except that the alkyd dispersion has improved heat age stability, i.e. the difference between the initial average volume particle size diameter and the final average volume particle size diameter (i.e. after accelerated aging according to the Heat Age Stability test method) is less than 20 percent.

BRIEF DESCRIPTION OF THE DRAWINGS

For the purpose of illustrating the invention, there is shown in the drawings a form that is exemplary; it being understood, however, that this invention is not limited to the precise arrangements and instrumentalities shown.

DETAILED DESCRIPTION OF THE INVENTION

Figure 1:
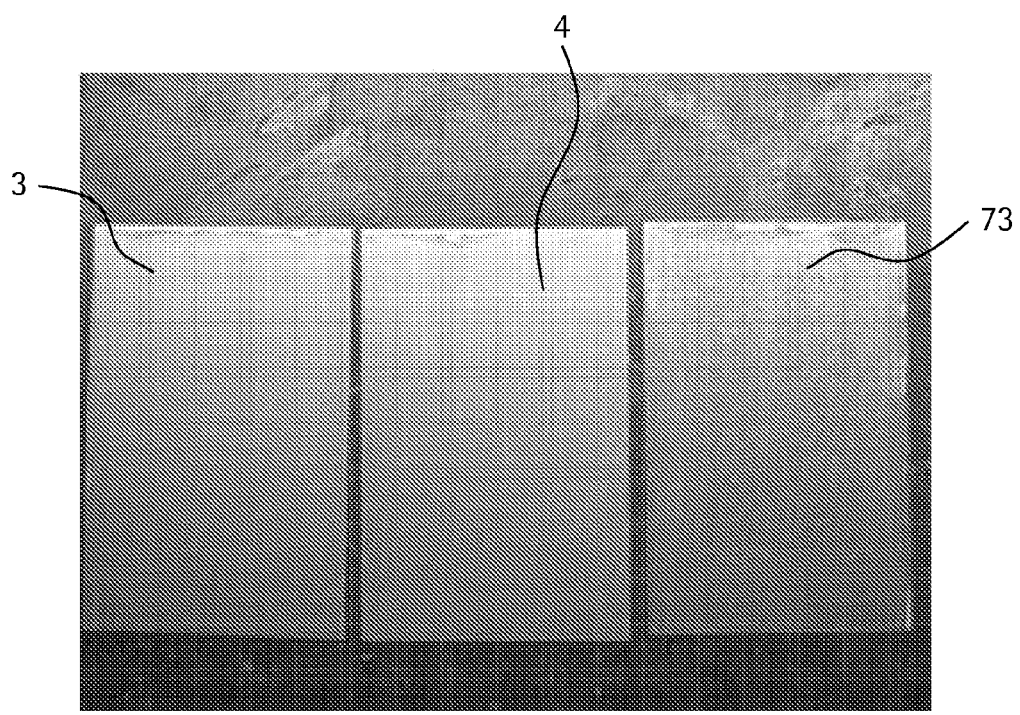
FIG. 1 is a photograph illustrating the color change after QUV of Inventive Example 9, designated as 3, Inventive Example 10 designated as 4, and Comparative Example designated as 73.

The present invention provides a coating composition, a process for producing the same, one or more coating layers derived therefrom, and articles comprising one or more such coating layers.

The coating composition according to the present invention comprises (a) from 10 to 90 percent by weight of an aqueous, high-solid, solvent-free alkyd dispersion comprising: (i) from 40 to 70 percent by weight of one or more alkyds based on the total weight of the dispersion, wherein each said one or more alkyds has an acid value of less than 20 and a molecular weight ($M_n$) in the range of greater than 1000 Dalton; (ii) from less than 10 percent by weight of one or more surfactants, based on the total weight of the dispersion; and (iii) from 30 to 55 percent by weight of water, based on the total weight of the dispersion; wherein said aqueous, high-solid, solvent-free alkyd dispersion has an average particle size diameter in the range of from 0.05 to 5 μm; (b) from 10 to 90 one or more second dispersions, one or more second emulsions, or combinations thereof; wherein said coating composition has a solid content of in the range of from 25 to 65 percent by weight of solid content, based on the total weight of the coating composition, and the coating composition has a pH in the range of from 7 to 11, and wherein the coating composition has a volume average particle size in the range of from 0.03 to 5 μm, and wherein the coating composition has a viscosity in the range of from 100 to 10,000 cP.

The method for producing the inventive coating composition comprises the steps of: (1) providing one or more molten or liquid alkyds, wherein each said one or more molten or liquid alkyds has an acid number of less than 20 and a molecular weight ($M_n$) in the range of greater than 1000 Dalton; (2) providing one or more surfactants; (3) providing water; (4) optionally providing one or more neutralizing agents; (5) continuously emulsifying said one or more molten or liquid alkyds in the water in the presence of said one or more surfactants and optionally said one or more neutralizing agents; (6) thereby producing a high internal phase emulsion; (7) providing additional water; (8) contacting said high internal phase emulsion with said additional water; (9) thereby producing said aqueous alkyd dispersion, wherein said alkyd dispersion comprises from 40 to 70 percent by weight of said one or more alkyds, from less than 10 percent by weight of said one or more surfactants, and wherein said dispersion has an average particle size diameter in the range of from 0.05 to 5 μm; (10) providing one or more second dispersions and/or second emulsions; (11) contacting said alkyd dispersion and one or more second dispersion and/or second emulsions; and (12) thereby forming the coating composition.

In an alternative embodiment, the present invention provides one or more coating layers derived from the inventive coating composition, as described herein, and an article comprising one or more such coating layers.

The coating composition according to the present invention may further comprise optionally one or more solvents; optionally one or more co-solvents; optionally one or more fillers; optionally one or more additives; optionally one or more pigments, e.g. titanium dioxide, mica, calcium carbonate, silica, zinc oxide, milled glass, aluminum trihydrate, talc, antimony trioxide, fly ash, and clay; optionally one or more modified pigments such as polymer encapsulated pigments, e.g. polymer encapsulated titanium dioxide, polymer encapsulated zinc oxide, and polymer encapsulated lithopone, optionally a pigment comprising titanium dioxide and one or more polymers or emulsions associated with surface thereof, optionally one or more hollow pigments, including such hollow pigments comprising one or more voids, optionally one or more dispersants, e.g. aminoalcohols, and polycarboxylates; optionally one or more surfactants; optionally one or more defoamers; optionally one or more preservatives, e.g. biocides, mildewcides, fungicides, algaecides, and combinations thereof; optionally one or more thickeners, e.g. cellulosic based thickeners such as hydroxyethyl cellulose, hydrophobically modified alkali soluble emulsions and hydrophobically modified ethoxylated urethane thickeners (HEUR); optionally one or more biocides; optionally more defoamers; optionally one or more flow agents; optionally one or more leveling agents; or optionally one or more additional neutralizing agents, e.g. hydroxides, amines, ammonia, and carbonates.

The coating composition may further comprise a colorant. A variety of colors may be used. Examples include colors such as yellow, magenta, and cyan. As a black coloring agent, carbon black, and a coloring agent toned to black using the yellow/magenta/cyan coloring agents shown below may be used. Colorants, as used herein, include dyes, pigments, and pre-dispersions, among others. These colorants may be used singly, in a mixture, or as a solid solution. In various embodiments, pigments may be provided in the form of raw pigments, treated pigments, pre-milled pigments, pigment powders, pigment presscakes, pigment masterbatches, recycled pigment, and solid or liquid pigment pre-dispersions. As used herein, a raw pigment is a pigment particle that has had no wet treatments applied to its surface, such as to deposit various coatings on the surface. Raw pigment and treated pigment are further discussed in PCT Publication No. WO 2005/095277 and U.S. Patent Application Publication No. 20060078485, the relevant portions of which are incorporated herein by reference. In contrast, a treated pigment may have undergone wet treatment, such as to provide metal oxide coatings on the particle surfaces. Examples of metal oxide coatings include alumina, silica, and zirconia. Recycled pigment may also be used as the starting pigment particles, where recycled pigment is pigment after wet treatment of insufficient quality to be sold as coated pigment.

Exemplary colorant particles include, but are not limited to, pigments such as yellow coloring agent, compounds typified by a condensed azo compound, an isoindolynone compound, an anthraquinone compound, an azometal complex methine compound, and an allylamide compound as pigments may be used. As a magenta coloring agent, a condensed azo compound, a diketopyrrolopyrrole compound, anthraquinone, a quinacridone compound, a base dye lake compound, a naphthol compound, a benzimidazolone compound, a thioindigo compound, and a perylene compound may be used. As a cyan coloring agent, a copper phthalocyanine compound and its derivative, an anthraquinone compound, a base dye lake compound, and the like may be used.

Alkyd Dispersion Component

The coating composition comprises from 10 to 90 percent by weight of an aqueous, high-solid, solvent-free alkyd dispersion; for example, from 20 to 90 percent by weight; or in the alternative, from 30 to 90 weight percent; or in the alternative, from 40 to 85 weight percent; or in the alternative, from 30 to 80 weight percent. All individual values and subranges from 10 to 90 weight percent are included herein and disclosed herein; for example, the weight percent can be from a lower limit of 10, 20, 30, 40, 50, 60, 70, 80, or 85 to an upper limit 20, 30, 40, 50, 60, 70, 80, or 90. The alkyds dispersion comprises from 40 to 70 percent by weight of one or more alkyds. All individual values and subranges from 40 to 70 weight percent are included herein and disclosed herein; for example, the weight percent can be from a lower limit of 40, 45, 50, 55, or 60 to an upper limit of 60, 65, or 70. Each one or more alkyds has an acid value in the range of 20 or less. All individual values and subranges from 20 or less acid value are included herein and disclosed herein; for example, the acid value can be from a lower limit of one, 0.1, 0.5, 1, 2, 5, 70 or 10 to an upper limit of 5, 7, 10, 15, or 20. Each one or more alkyds has a molecular weight ($M_n$) in the range of equal to or greater than 1000 Dalton; for example, equal to or greater than 2000 Dalton, or in the alternative, equal to or greater than 4000 Dalton.

The alkyd resins suitable for the present invention have a viscosity in the range of from 100 to 1,500,000 Centipoise (mPa·s) at 80° C. and shear rate of 0.10/sec. All individual values and subranges from 100 to 1,500,000 Centipoise (mPa·s) at 80° C. and shear rate of 0.10/sec are included herein and disclosed herein; for example, the viscosity may be from a lower limit of 100, 1000, 5000, 15000, or 25000 Centipoise (mPa·s) at 80° C. and shear rate of 0.10/sec to an upper limit of 100,000, 250,000, 500,00, 750,000, 1,000,000, or 1,500,000 Centipoise (mPa·s) at 80° C. and shear rate of 0.10/sec.

Alkyd resins are polyesters of polyhydroxyl alcohols and polycarboxylic acids chemically combined with various drying and semi-drying oils in different proportions. Polyhydroxyl alcohols may include, but are not limited to, such components as ethylene glycol, diethylene glycol, neopentyl glycol, 1,4-butanediol, 1,6-hexanediol, glycerol, pentaerythritol, sorbitol and mannitol.

Suitable glycols thus include ethylene glycol, propylene glycol, diethylene glycol, triethylene glycol, tetraethylene glycol, pentaethylene glycol, hexaethylene glycol, heptaethylene glycol, octaethylene glycol, nonaethylene glycol, decaethylene glycol, neopentyl glycol, glycerol, 1,3-propanediol, 2,4-dimethyl-2-ethyl-hexane-1,3-diol, 2,2-dimethyl-1,2-propanediol, 2-ethyl-2-butyl-1,3-propanediol, 2-ethyl-2-isobutyl-1,3-propanediol, 1,3-butanediol, 1,4-butanediol, 1,5-pentanediol, 1,6-hexanediol, 2,2,4-tetramethyl-1,6-hexanediol, thiodiethanol, 1,2-cyclohexanedimethanol, 1,3-cyclohexanedimethanol, 1,4-cyclohexanedimethanol, 2,2,4-trimethyl-1,3-pentanediol, 2,2,4-tetramethyl-1,3-cyclobutanediol, p-xylenediol, hydroxypivalyl hydroxypivalate, 1,10-decanediol, hydrogenated bisphenol A, trimethylolpropane, trimethylolethane, pentaerythritol, erythritol, threitol, dipentaerythritol, sorbitol, mannitol, glycerine, trimellitic anhydride, pyromellitic dianhydride, dimethylolpropionic acid, and the like.

Polycarboxylic acids may include, but are not limited to, phthalic acid, maleic acid, fumaric acid, isophthalic acid, succinic acid, adipic acid, azeleic acid, and sebacic acid, terephthalic acid, tetrachlorophthalic anhydride, tetrahydrophthalic anhydride, dodecanedioic acid, sebacic acid, azelaic acid, 1,4-cyclohexanedicarboxylic acid, 1,3-cyclohexanedicarboxylic acid, 2,6-naphthalenedicarboxylic acid, glutaric acid, trimellitic anhydride acid, citric acid, pyromellitic dianhydride acid, trimesic acid, sodium sulfoisophthalic acid, as well as from anhydrides of such acids, and esters thereof, where they exist. Optionally moncarboxylic acids may be employed including, but not limited to, benzoic acid.

Drying oils may include, but are not limited to, coconut oil, fish oil, linseed oil, tung oil, castor oil, cottonseed oil, safflower oil, sunflower oil, soybean oil, and tall oil.

In addition to an amount of polyol reacted with a fatty acid, fatty ester, or naturally occurring-partially saponified oil, an additional amount of a polyol or other branching agent such as a polycarboxylic acid may be used to increase the molecular weight and branching of the alkyd resin, and may be selected from trimethylolethane, pentaerythritol, erythritol, threitol, dipentaerythritol, sorbitol, glycerine, trimellitic anhydride, pyromellitic dianhydride, dimethylolpropionic acid, and trimethylolpropane.

Alkyds may be produced, for example, by direct fusion of glycerol, phthalic anhydride and drying oil. Solvents may be added to reduce the viscosity. Various proportions of the polycarboxylic acid, polyhydric alcohol, and oil are used to obtain alkyd resins of various properties, as is well known in the art.

Alkyds may further include any one or more modifications, for example, alkyd may be urethane modified, acrylic modified, styrene modified, vinyl ester modified, vinyl ether modified, silicone modified, epoxy modified, combinations thereof, and the like.

One or more alkyds may, for example, be one or more uralkyds, i.e. urethane modified alkyd. Uralkyds may be prepared by reacting alkyds having isocyanate-reactive groups with polyisocyanates and optionally other components having isocyanate-reactive groups. Isocyanate-reactive groups are defined as groups which will react with an isocyanate group (—NCO) and examples include —OH, —NH$_2$, —NH—, and —SH. Preferred isocyanate-reactive groups are —OH. Other components include but are not limited to polyamines and polyols, for example polyols having water-dispersing groups, as described below.

Examples of suitable polyisocyanate(s), (normally diisocyanate(s)) include aliphatic and cycloaliphatic polyisocyanates such as ethylene diisocyanate, 1,6-hexamethylene diisocyanate HDI, isophorone diisocyanate (IPDI), cyclohexane-1,4-diisocyanate, 4,4'-dicyclohexylmethane diisocyanate, cyclopentylene diisocyanate, p-tetra-methylxylene diisocyanate (p-TMXDI) and its meta isomer (m-TMXDI), hydrogenated 2,4-toluene diisocyanate and hydrogenated 2,6-toluene diisocyanate. Also araliphatic and aromatic polyisocyanates may be used, such as p-xylene diisocyanate, 1,4-phenylene diisocyanate, 2,4-toluene diisocyanate, 2,6-toluene diisocyanate, 4,4'-diphenylmethane diisocyanate, 2,4'-diphenylmethane diisocyanate and 1,5-naphthylene diisocyanate. Particularly preferred is 2,4-toluene diisocyanate (TDI), optionally in admixture with its 2,6-isomer.

Examples of suitable polyols for use in preparation of uralkyds include difunctional alcohols, trifunctional alcohols (e.g., glycerine, trimethylol propane, trimethylol ethane, trimethylol butane, tris hydroxyethyl isocyanurate, etc.), tetrahydric or higher alcohols (e.g., pentaerythritol, diglycerol, etc.), and combinations thereof. Trifunctional alcohols are preferred due to the degree of branching they allow. Difunctional alcohols (or diols), if used, are preferably used in combination with trifunctional or higher alcohols. Examples of suitable diols include neopentyl glycol (NPG), ethylene glycol, propylene glycol, diethylene glycol, triethylene glycol, tetraethylene glycol, pentaethylene glycol, hexaethylene glycol, heptaethylene glycol, octaethylene glycol, nonaethylene glycol, decaethylene glycol, 1,3-propanediol, 2,4-dimethyl-2-ethyl-hexane-1,3-diol, 2,2-dimethyl-1,2-propanediol, 2-ethyl-2-butyl-1,3-propanediol, 2-ethyl-2-isobutyl-1,3-propanediol, 1,3-butanediol, 1,4-butanediol, 1,5-pentanediol, 1,6-hexanediol, 2,2,4-tetramethyl-1,6-hexanediol, thiodiethanol, 1,2-cyclohexanedimethanol, 1,3-cyclohexane-dimethanol, 1,4-cyclohexanedimethanol, 2,2,4-trimethyl-1,3-pentanediol, 2,2,4-tetramethyl-1,3-cyclobutanediol, p-xylenediol, hydroxypivalylhydroxypivalate, 1,10-decanediol, and hydrogenated bisphenol A.

The reaction mixture for producing alkyds includes one or more aliphatic or aromatic polycarboxylic acids, esterified polymerization products thereof, and combinations thereof. As used herein, the term "polycarboxylic acid" includes both polycarboxylic acids and anhydrides thereof. Examples of suitable polycarboxylic acids for use in the present invention include phthalic acid, isophthalic acid, terephthalic acid, tetrahydrophthalic acid, naphthalene dicarboxylic acid, and anhydrides and combinations thereof.

Mixtures of polyisocyanates can be used and also polyisocyanates which have been modified by the introduction of urethane, allophanate, urea, biuret, carbodiimide, uretonimine or isocyanurate residues.

Alkyds may include water-dispersing groups, for example, ionic groups such as anionic carboxylic acid groups, and/or non-ionic water-dispersing groups such as polyethylene oxide (PEO) chain groups.

A suitable polyol(s) having carboxylic acid groups is, for example, a low molecular weight (<500 Daltons) polyol, in particular a diol, whereby carboxylate anionic groups is provided by the carboxylic acid groups after neutralization with a suitable base. Exemplary diol includes, but are not limited to, dihydroxyalkanoic acids, and 2,2-dimethylol propionic acid (DMPA).

The one or more alkyds may be partially or fully neutralized with a neutralizing agent. In certain embodiments, neutralization of the one or more alkyds may be from 5 to 200 percent on a molar basis; or in the alternative, it may be from 25 to 100 percent on a molar basis. The neutralizing agent may be a base, such as ammonium hydroxide or potassium hydroxide, for example. Other neutralizing agents can include lithium hydroxide or sodium hydroxide, for example. In another alternative, the neutralizing agent may, for example, be a carbonate. In another alternative, the neutralizing agent may, for example, be any amine such as monoethanolamine, or 2-amino-2-methyl-1-propanol (AMP). Amines useful in embodiments disclosed herein may include monoethanolamine, diethanolamine, triethanolamine, and TRIS AMINO (each available from Angus), NEUTROL TE (available from BASF), as well as triisopropanolamine, diisopropanolamine, and N,N-dimethylethanolamine (each available from The Dow Chemical Company, Midland, Mich.). Other useful amines may include ammonia, monomethylamine, dimethylamine, trimethylamine, monoethylamine, diethylamine, triethylamine, mono-n-propylamine, dimethyl-n propylamine, N-methanol amine, N-aminoethylethanolamine, N-methyldiethanolamine, monoisopropanolamine, N,N-dimethyl propanolamine, 2-amino-2-methyl-1-propanol, tris(hydroxymethyl)-aminomethane, N,N,N'N'-tetrakis(2-hydroxylpropyl) ethylenediamine, 1,2-diaminopropane. In some embodiments, mixtures of amines or mixtures of amines with bases may be used. Those having ordinary skill in the art will appreciate that the selection of an appropriate neutralizing agent depends on the specific composition formulated, and that such a choice is within the knowledge of those of ordinary skill in the art.

The aqueous alkyd dispersion further comprises from less than 10 percent by weight of one or more stabilizing agents, based on the total weight of the dispersion. All individual values and subranges from less than 10 weight percent are included herein and disclosed herein; for example, the weight percent can be from a lower limit of 1, 2, 3, 4, 5, 6 or 7 weight percent to an upper limit of 2, 3, 4, 6, 8, 9, or 10. The stabilizing agent may, for example, be an external stabilizing agent or an internal stabilizing agent. In selected embodiments, the stabilizing agent may be a surfactant, a polymer, or mixtures thereof. In certain embodiments, the stabilizing agent can be a polar polymer, having a polar group as either a comonomer or grafted monomer. In exemplary embodiments, the stabilizing agent comprises one or more polar polyolefins, having a polar group as either a comonomer or grafted monomer. Exemplary polymeric stabilizing agents include, but are not limited to, ethylene-acrylic acid (EAA) and ethylene-methacrylic acid copolymers, such as those available under the trademarks PRIMACOR™, commercially available from The Dow Chemical Company, NUCREL™, commercially available from E.I. DuPont de Nemours, and ESCOR™ commercially available from ExxonMobil Chemical Company and described in U.S. Pat. Nos. 4,599,392, 4,988,781, and 5,938,437, each of which is incorporated herein by reference in its entirety. Other exemplary polymeric stabilizing agents include, but are not limited to, ethylene ethyl acrylate (EEA) copolymer, ethylene methyl methacrylate (EMMA), and ethylene butyl acrylate (EBA). Other ethylene-carboxylic acid copolymer may also be used. Those having ordinary skill in the art will recognize that a number of other useful polymers may also be used.

Other stabilizing agents that may be used include, but are not limited to, long chain fatty acids, fatty acid salts, or fatty acid alkyl esters having from 12 to 60 carbon atoms. In other embodiments, the long chain fatty acid or fatty acid salt may have from 12 to 40 carbon atoms.

The stabilizing agent may be partially or fully neutralized with a neutralizing agent. In certain embodiments, neutralization of the stabilizing agent, such as a long chain fatty acid or EAA, may be from 25 to 200 percent on a molar basis; or in the alternative, it may be from 50 to 110 percent on a molar basis. For example, for EAA, the neutralizing agent may be a base, such as ammonium hydroxide or potassium hydroxide, for example. Other neutralizing agents can include lithium hydroxide or sodium hydroxide, for example. In another alternative, the neutralizing agent may, for example, be a carbonate. In another alternative, the neutralizing agent may, for example, be any amine such as monoethanolamine, or 2-amino-2-methyl-1-propanol (AMP). Amines useful in embodiments disclosed herein may include monoethanolamine, diethanolamine, triethanolamine, and TRIS AMINO (each available from Angus), NEUTROL TE (available from BASF), as well as triisopropanolamine, diisopropanolamine, and N,N-dimethylethanolamine (each available from The Dow Chemical Company, Midland, Mich.). Other useful amines may include ammonia, monomethylamine, dimethylamine, trimethylamine, monoethylamine, diethylamine, triethylamine, mono-n-propylamine, dimethyl-n propylamine, N-methanol amine, N-aminoethylethanolamine, N-methyldiethanolamine, monoisopropanolamine, N,N-dimethyl propanolamine, 2-amino-2-methyl-1-propanol, tris(hydroxymethyl)-aminomethane, N,N,N'N'-tetrakis(2-hydroxylpropyl) ethylenediamine, 1,2-diaminopropane. In some embodiments, mixtures of amines or mixtures of amines and surfactants may be used. Those having ordinary skill in the art will appreciate that the selection of an appropriate neutralizing agent depends on the specific composition formulated, and that such a choice is within the knowledge of those of ordinary skill in the art.

Additional stabilizing agents that may be useful in the practice of the present invention include, but are not limited to, cationic surfactants, anionic surfactants, or non-ionic surfactants. Examples of anionic surfactants include, but are not limited to, sulfonates, carboxylates, and phosphates. Examples of cationic surfactants include, but are not limited to, quaternary amines. Examples of non-ionic surfactants include, but are not limited to, block copolymers containing ethylene oxide and silicone surfactants. Stabilizing agents useful in the practice of the present invention can be either external surfactants or internal surfactants. External surfactants are surfactants that do not become chemically reacted into the alkyd resin during dispersion preparation. Examples of external surfactants useful herein include, but are not limited to, salts of dodecyl benzene sulfonic acid and lauryl sulfonic acid salt. Internal surfactants are surfactants that do become chemically reacted into the alkyd resin during dispersion preparation. An example of an internal surfactant useful herein includes 2,2-dimethylol propionic acid and its salts. Additional surfactants that may be useful in the practice of the present invention include cationic surfactants, anionic surfactants, non-ionic surfactants, or combinations thereof. Various commercially available surfactants may be used in embodiments disclosed herein, including: OP-100 (a sodium stearate), OPK-1000 (a potassium stearate), and OPK-181 (a potassium oleate), each available from RTD Hallstar; UNICID 350, available from Baker Petrolite; DISPONIL FES 77-IS, DISPONIL FES-32-IS, DISPONIL FES-993, and DISPONIL TA-430, each available from Cognis; RHODAPEX CO-436, SOPROPHOR 4D384, 3D-33, and 796/P, RHODACAL BX-78 and LDS-22, RHODAFAC RE-610, and RM-710, and SUPRAGIL MNS/90, each available from Rhodia; E-sperse 100, E-sperse 700, and E-sperse 701 from Ethox Chemical; and TRITON QS-15, TRITON W-30, DOWFAX 2A1, DOWFAX 3B2, DOWFAX 8390, DOWFAX C6L, TRITON X-200, TRITON XN-45S, TRITON H-55, TRITON GR-5M, TRITON BG-10, and TRITON CG-110, each available from The Dow Chemical Company, Midland, Mich.

The alkyd dispersion further comprises a fluid medium. The fluid medium may be any medium; for example, the fluid medium may be water. The alkyd dispersion of the present invention comprises 35 to 75 percent by weight of fluid medium, based on the total weight of the dispersion. In particular embodiments, the water content may be in the range of from 35 to 65, or in the alternative from 35 to 55, or in the alternative from 45 to 55 percent by weight, based on the total weight of the dispersion. Water content of the alkyd dispersion may preferably be controlled so that the solids content is between about 1 percent to about 90 percent by weight, based on the total weight of the dispersion. In particular embodiments, the solids range may be between about 10 percent to about 70 percent by weight. In other particular embodiments, the solids range is between about 40 percent to about 70 percent by weight. In certain other embodiments, the solids range is between about 25 percent to about 55 percent by weight.

The solid content of the alkyd dispersion has an average particle size diameter in the range of from 0.05 to 5 µm. All individual values and subranges from 0.05 to 5 µm are included herein and disclosed herein; for example, the average particle size diameter can be from a lower limit of 0.05, 0.1, 0.2, 0.5, or 1 µm to an upper limit of 1, 2, 3, 4, or 5 µm.

The alkyd dispersion according to the present invention may further be blended with one or more binder compositions such as acrylic latex, vinyl acrylic latex, styrene acrylic latex, vinyl acetate ethylene latex, and combinations thereof; optionally one or more solvents; optionally one or more co-solvents; optionally one or more fillers; optionally one or more additives; optionally one or more pigments, e.g. titanium dioxide, mica, calcium carbonate, silica, zinc oxide, milled glass, aluminum trihydrate, talc, antimony trioxide, fly ash, and clay; optionally one or more dispersants, e.g. aminoalcohols, and polycarboxylates; optionally one or more surfactants; optionally one or more defoamers; optionally one or more preservatives, e.g. biocides, mildewcides, fungicides, algaecides, and combinations thereof; optionally one or more thickeners, e.g. cellulosic based thickeners such as hydroxyethyl cellulose, hydrophobically modified alkali soluble emulsions and hydrophobically modified ethoxylated urethane thickeners (HEUR); optionally one or more biocides; optionally more defoamers; optionally one or more flow agents; optionally one or more leveling agents; or optionally one or more additional neutralizing agents, e.g. hydroxides, amines, ammonia, and carbonates.

The alkyd dispersion may further comprise a colorant as part of the alkyd dispersion. A variety of colors may be used. Examples include colors such as yellow, magenta, and cyan. As a black coloring agent, carbon black, and a coloring agent toned to black using the yellow/magenta/cyan coloring agents shown below may be used. Colorants, as used herein, include dyes, pigments, and pre-dispersions, among others. These colorants may be used singly, in a mixture, or as a solid solution. In various embodiments, pigments may be provided in the form of raw pigments, treated pigments, pre-milled pigments, pigment powders, pigment presscakes, pigment masterbatches, recycled pigment, and solid or liquid pigment pre-dispersions. As used herein, a raw pigment is a pigment particle that has had no wet treatments applied to its surface, such as to deposit various coatings on the surface. Raw pigment and treated pigment are further discussed in PCT Publication No. WO 2005/095277 and U.S. Patent Application Publication No. 20060078485, the relevant portions of which are incorporated herein by reference. In contrast, a treated pigment may have undergone wet treatment, such as to provide metal oxide coatings on the particle surfaces. Examples of metal oxide coatings include alumina, silica, and zirconia. Recycled pigment may also be used as the starting pigment particles, where recycled pigment is pigment after wet treatment of insufficient quality to be sold as coated pigment.

Exemplary colorant particles include, but are not limited to, pigments such as yellow coloring agent, compounds typified by a condensed azo compound, an isoindolynone compound, an anthraquinone compound, an azometal complex methine compound, and an allylamide compound as pigments may be used. As a magenta coloring agent, a condensed azo compound, a diketopyrrolopyrrole compound, anthraquinone, a quinacridone compound, a base dye lake compound, a naphthol compound, a benzimidazolone compound, a thioindigo compound, and a perylene compound may be used. As a cyan coloring agent, a copper phthalocyanine compound and its derivative, an anthraquinone compound, a base dye lake compound, and the like may be used.

In one embodiment, one or more alkyds, one or more stabilizing agents are melt-kneaded in an extruder along with water and a neutralizing agent, such as ammonia, potassium hydroxide, or a combination of the two to form an alkyd dispersion. In another embodiment, one or more liquid alkyds, one or more stabilizing agents are melt-kneaded in an extruder along with water and a neutralizing agent, such as ammonia, potassium hydroxide, or a combination of the two to form an alkyd dispersion. In some embodiments, the dispersion is first diluted to contain about 1 to about 20 percent by weight water and then, subsequently, further diluted to comprise greater than about 25 percent by weight water.

Any melt-kneading means known in the art may be used. In some embodiments, a kneader, a BANBURY® mixer, single-screw extruder, or a multi-screw extruder, e.g. a twin screw extruder, is used. A process for producing the dispersions in accordance with the present invention is not particularly limited. For example, an extruder, in certain embodiments, for example, a twin screw extruder, is coupled to a back pressure regulator, melt pump, or gear pump. Exemplary embodiments also provide a base reservoir and an initial water reservoir, each of which includes a pump. Desired amounts of base and initial water are provided from the base reservoir and the initial water reservoir, respectively. Any suitable pump may be used, but in some embodiments, for example, a pump that provides a flow of about 150 cc/min at a pressure of 240 bar is used to provide the base and the initial water to the extruder. In other embodiments, a liquid injection pump provides a flow of 300 cc/min at 200 bar or 600 cc/min at 133 bar. In some embodiments, the base and initial water are preheated in a preheater.

One or more alkyds, in the form of liquid, pellets, powder, or flakes, are fed from the feeder to an inlet of the extruder where the resin is melted or compounded. Optionally one or more fillers may be fed simultaneously with one or more alkyds into the extruder via the feeder; or in the alternative, one or more fillers may be compounded into one or more alkyds, and then fed into the extruder via the feeder. In the alternative, additional one or more fillers may further be metered via an inlet prior to the emulsification zone into the molten compound comprising one or more alkyds and optionally one or more fillers. In some embodiments, the stabilizing agent is added to one or more alkyds through and along with the one or more alkyds and in other embodiments, the stabilizing agent is provided separately to the twin screw extruder. The resin melt is then delivered from the mix and convey zone to an emulsification zone of the extruder where the initial amount of water and base from the water and base reservoirs are added through an inlet. In some embodiments, stabilizing agent may be added additionally or exclusively to the water stream. In some embodiments, further dilution water may be added via water inlet from water reservoir in a dilution and cooling zone of the extruder. Typically, the dispersion is diluted to at least 30 weight percent water in the cooling zone. In addition, the diluted mixture may be diluted any number of times until the desired dilution level is achieved. In some embodiments, water is not added into the twin screw extruder but rather to a stream containing the resin melt after the melt has exited from the extruder. In this manner, steam pressure build-up in the extruder is eliminated and the dispersion is formed in a secondary mixing device such as a rotor stator mixer.

In an alternative, one or more alkyds, in the form of liquid or molten are fed into a first mixing device, such as a rotor stator mixer, and brought into contact with water, and optionally a neutralizing agent, in the presence of one or more stabilizing agents, thereby forming a high internal phase emulsion. Subsequently, the high internal phase emulsion is contacted with additional water, thereby producing the alkyd dispersion of the present invention. The one or more alkyds may be melted via, for example, a melt pump. Such melt pumps are generally known to a person of ordinary skill in the art.

The aqueous alkyd dispersions are substantially free of any volatile organic compounds; for example, the aqueous alkyd dispersions are free of any volatile organic compounds. Substantially free of any volatile organic compounds, such as certain solvents, refers to the inventive alkyd dispersions comprising less than 0.5 percent by weight of any volatile organic compounds, based on the total weight of the dispersion; for example, less than 0.05 weight percent, or less than 0.01 weight percent. The aqueous alkyd dispersion has a viscosity in the range of from 100 to 10,000 cP; for example, from 100 to 1,000 cP. The inventive aqueous alkyd dispersion has a pH in the range of less than 12; for example, less than 11, or less than 10, or less than 9, and greater than 5, or greater than 6, or greater than 7.

The continuous process for producing the aqueous, high-solid, solvent-free alkyd dispersion, comprises the steps of: (1) providing one or more molten or liquid alkyds, wherein each said one or more molten or liquid alkyds has an acid number of less than 20 and a molecular weight ($M_n$) in the range of greater than 1000 Dalton; (2) providing one or more stabilizing agents; (3) providing water; (4) optionally providing one or more neutralizing agents; (5) continuously emulsifying said one or more molten or liquid alkyds in the water in the presence of said one or more surfactants and optionally said one or more neutralizing agents; (6) thereby producing a high internal phase emulsion; (7) providing additional water; (8) contacting said high internal phase emulsion with said additional water; (9) thereby producing said aqueous alkyd dispersion, wherein said alkyd dispersion comprises from 45 to 70 percent by weight of said one or more alkyds, from less than 10 percent by weight of said one or more stabilizing agents, and wherein said dispersion has an average particle size diameter in the range of from 0.05 to 5 μm.

Suitable driers for use in the alkyd dispersion component of the present invention include without limitation, metal-containing compounds; for example, cobalt, zirconium, manganese, calcium, zinc, copper, barium, vanadium, cerium, iron, potassium, strontium, aluminum, bismuth and lithium-containing compounds. Examples of non-metallic drier promoters include 8-hydroxyquinoline, quinoline, salicyl aldoxime, pyridine-2-carbaldoxime, acetylacetonate enamines, 2-2'-bipyridyl, ethylenediamine, propylenediamine, pyridine, o-vinylpyridine, o-aminopyridine, aniline, o-phenylenediamine, o-toluidine, alpha-naphthylamine, o-phenanthroline, dipropylamine, diamylamine, acrylonitrile, succinonitrile, o-tolunitrile, o-toluamide, pyrrole, benzimidazole, benzotriazole, benzophenone, benzophenone methacrylate, and the like. Driers and drier promoters can be present in the range of 0.0002 weight percent to 1.0 weight percent, based on the total weight of the alkyd, for example, from 0.0002 weight percent to 0.5 weight percent, based on the weight of the alkyd; or in the alternative, from 0.0005 weight percent to 0.5 weight percent. Oxi-Coat (OMG Fe based drier) as well as combination of Co Hydro-Cure II, Dri-RX HF, and Zr Hydro-CEM can be used to yield a coating improved performance profile.

Second Dispersion/Second Emulsion Component

The coating composition comprises from 10 to 90 percent by weight of one or more second dispersions, one or more second emulsions, or combinations thereof; for example, from 20 to 90 percent by weight; or in the alternative, from 30 to 90 weight percent; or in the alternative, from 40 to 85 weight percent; or in the alternative, from 30 to 80 weight percent. All individual values and subranges from 10 to 90 weight percent are included herein and disclosed herein; for example, the weight percent can be from a lower limit of 10, 20, 30, 40, 50, 60, 70, 80, or 85 to an upper limit 20, 30, 40, 50, 60, 70, 80, or 90.

The second dispersion may be selected from the group consisting of a polyurethane dispersion, a polyolefin dispersion, an epoxy resin dispersion, and a polyester dispersion.

The second emulsion may be an emulsion polymer latex selected from the group consisting of acrylic latex, vinyl acetate acrylic latex, styrene acrylic latex, vinyl acetate ethylene latex, and combinations thereof.

Polyurethane Dispersion

The second dispersion may be a polyurethane dispersion, for example, a natural oil based (NOP) polyurethane dispersion.

A natural oil based polyurethane dispersion may comprise a hydrophobic polyurethane dispersion derived from one or more natural oil based polyols. In the alternative, the polyurethane dispersion comprises a hydrophobic polyurethane prepolymer derived from one or more natural oil based polyols.

The hydrophobic polyurethane dispersion component may be prepared by forming an isocyanate-terminated prepolymer, dispersing the prepolymer in an aqueous phase, and then forming the polyurethane and/or urea polymer by chain-extending the prepolymer. The prepolymer itself is made by reacting an excess of a polyisocyanate with a polyol derived from one or more natural oil based polyols.

The polyurethane prepolymer derived from one or more natural oil based polyols used in the present invention may be produced by any conventionally known processes, for example, solution process, hot melt process, or polyurethane prepolymer mixing process, for example, in batch or continuous process. Furthermore, the polyurethane prepolymer derived from one or more natural oil based polyols may, for example, be produced via a process for reacting a polyisocyanate compound with an active hydrogen-containing compound, that is, one or more natural oil based polyols, and examples thereof include 1) a process for reacting a polyisocyanate compound with one or more natural oil based polyols without using an organic solvent, and 2) a process for reacting a polyisocyanate compound with one or more natural oil based polyols in an organic solvent, for example, N-Methylpyrrolidone (NMP), or Acetone, or Methyl Ethyl Ketone (MEK), PROGLYDE DMM (dipropylene glycol dimethyl ether, CAS No. 111109-77-4), followed optionally by removal of the solvent. In one embodiment, the polyurethane prepolymer is preferably derived from the reaction of a polyisocyanate compound with one or more natural oil based polyols, for example, seed oil derived polyol.

For example, the polyisocyanate compound may be reacted with one or more natural oil based polyols at a temperature in the range of 20° C. to 150° C.; or in the alternative, in the range of 30° C. to 130° C., at an equivalent ratio of an isocyanate group to an active hydrogen group of, for example, from 1.1:1 to 3:1, or in the alternative, from 1.2:1 to 2:1. In the alternative, the prepolymer may be prepared with an excess amount of one or more natural oil based polyols thereby facilitating the production of hydroxyl terminal polymers.

The natural oil based polyols are polyols based on or derived from renewable feedstock resources such as natural and/or genetically modified plant vegetable seed oils and/or animal source fats. Such oils and/or fats are generally comprised of triglycerides, that is, fatty acids linked together with glycerol. Examples include, but are not limited to, vegetable oils that have at least 70 percent unsaturated fatty acids in the triglyceride. The natural product may contain at least 85 percent by weight of unsaturated fatty acids. Exemplary vegetable oils include, but are not limited to, for example, those from castor, soybean, olive, peanut, rapeseed, corn, sesame, cotton, canola, safflower, linseed, palm, grapeseed, black caraway, pumpkin kernel, borage seed, wood germ, apricot kernel, pistachio, almond, macadamia nut, avocado, sea buckthorn, hemp, hazelnut, evening primrose, wild rose, thistle, walnut, sunflower, jatropha seed oils, or any combinations thereof. Additionally, oils obtained from organisms such as algae may also be used. Exemplary animal products include, but are not limited to, lard, beef tallow, fish oils and any mixtures or combinations thereof. A combination of vegetable and animal based oils/fats may also be used.

Several chemistries can be used to modify seed oils and seed oil esters in order to prepare the natural oil based polyols. Such modifications of a renewable resource include, but are not limited to, for example, epoxidation, hydroxylation, ozonolysis, esterification, hydroformylation, dimerization, or alkoxylation. Such modifications are commonly known in the art.

After the production of such polyols by modification of the natural oils, the modified products may be further alkoxylated. The use of ethylene oxide (EO) or mixtures of EO with other oxides, introduces hydrophilic moieties into the polyol. In one embodiment, the modified product undergoes alkoxylation with sufficient EO to produce a natural oil based polyol having an EO content in the range of 10 to 60 weight percent, for example, 20 to 40 weight percent.

In another embodiment, the natural oil based polyols are obtained by a multi-step process wherein the animal or vegetable oils/fats are subjected to transesterification and the constituent fatty acid esters recovered. This step is followed by hydroformylating carbon-carbon double bonds in the constituent fatty acid esters to form hydroxymethyl groups, and then forming a polyester or polyether/polyester by reaction of the hydroxymethylated fatty acid with an appropriate initiator compound. Such a multi-step process is commonly known in the art, and is described, for example, in the PCT Publication Nos. WO 2004/096882 and 2004/096883. The multi-step process results in the production of a polyol with both hydrophobic and hydrophilic moieties, which results in enhanced miscibility with both water and conventional petroleum-based polyols.

The initiator for use in the multi-step process for the production of the natural oil based polyols may be any initiator used in the production of conventional petroleum-based polyols. The initiator may, for example, be selected from the group consisting of neopentylglycol; 1,2-propylene glycol; trimethylolpropane; pentaerythritol; sorbitol; sucrose; glycerol; diethanolamine; alkanediols such as 1,6-hexanediol, 1,4-butanediol; 1,4-cyclohexane diol; 2,5-hexanediol; ethylene glycol; diethylene glycol, triethylene glycol; bis-3-aminopropyl methylamine; ethylene diamine; diethylene triamine; 9(1)-hydroxymethyloctadecanol, 1,4-bishydroxymethylcyclohexane; 8,8-bis(hydroxymethyl)tricyclo[5,2,1,0$^{2,6}$]decene; Dimerol alcohol (36 carbon diol available from Henkel Corporation); hydrogenated bisphenol; 9,9(10,10)-bishydroxymethyloctadecanol; 1,2,6-hexanetriol and combination thereof. In the alternative, the initiator may be selected from the group consisting of glycerol; ethylene glycol; 1,2-propylene glycol; trimethylolpropane; ethylene diamine; pentaerythritol; diethylene triamine; sorbitol; sucrose; or any of the aforementioned where at least one of the alcohol or amine groups present therein has been reacted with ethylene oxide, propylene oxide or mixture thereof; and combination thereof. In another alternative, the initiator is glycerol, trimethylopropane, pentaerythritol, sucrose, sorbitol, and/or mixture thereof.

In one embodiment, the initiators are alkoxylated with ethylene oxide or a mixture of ethylene oxide and at least one other alkylene oxide to give an alkoxylated initiator with a molecular weight in the range of from 200 to 6000, for example, in the range of from 500 to 3000.

The functionality of the at least one natural oil based polyol, is above about 1.5 and generally not higher than about 6. In one embodiment, the functionality is below about 4. In one embodiment the functionality is in the range of from 1.5 to 3. In one embodiment the functionality is in the range of 1.5 to 2.2, for example, 2. The hydroxyl number of the at least one natural oil based polyol is below 300 mg KOH/g; for example, in the range of from 50 and 300; or in the alternative, in the range of from 60 to 200; or in the alternative, in the range of less than 100.

The level of renewable feedstock in the natural oil based polyol can be from 10 to 100 percent; for example, from 10 to 90 percent.

The natural oil based polyols may constitute up to 90 weight percent of a polyol blend. However, in one embodiment, the natural oil based polyol may constitute at least 5 weight percent, at least 10 weight percent, at least 25 weight percent, at least 35 weight percent, at least 40 weight percent, at least 50 weight percent, or at least 55 weight percent of the total weight of the polyol blend. The natural oil based polyols may constitute 40 percent or more, 50 weight percent or more, 60 weight percent or more, 75 weight percent or more, 85 weight percent or more, 90 weight percent or more, or 95 weight percent or more of the total weight of the combined polyols. Combination of two types or more of natural oil based polyols may also be used.

The viscosity measured at 25° C. of the natural oil based polyols is generally less than 6,000 mPa·s; for example, the viscosity measured at 25° C. of the natural oil based polyols is less than 5,000 mPa·s.

The natural oil based polyol may also be blended with one or more polyols including, but not limited to, aliphatic and/or aromatic polyester polyols including caprolactone based polyester polyols, any polyester/polyether hybrid polyols, PTMEG-based polyether polyols; polyether polyols based on ethylene oxide, propylene oxide, butylene oxide and mixtures thereof; polycarbonate polyols; polyacetal polyols, polyacrylate polyols; polyesteramide polyols; polythioether polyols; polyolefin polyols such as saturated or unsaturated polybutadiene polyols. The natural oil based polyol may also be blended with one or more short chain diols, one or more molecules that bear ionic centers such as dimethylol propionic acid; dimethylol butonic acid.

Examples of the polyisocyanate compound include 2,4-tolylene diisocyanate, 2,6-tolylene diisocyanate, m-phenylene diisocyanate, p-phenylene diisocyanate, 4,4'-diphenylmethane diisocyanate, 2,4'-diphenylmethane diisocyanate, 2,2'-diphenylmethane diisocyanate, 3,3'-dimethyl-4,4'-biphenylene diisocyanate, 3,3'-dimethoxy-4,4'-biphenylene diisocyanate, 3,3'-dichloro-4,4'-biphenylene diisocyanate, 1,5-naphthalene diisocyanate, 1,5-tetrahydronaphthalene diisocyanate, tetramethylene diisocyanate, 1,6-hexamethylene diisocyanate, dodecamethylene diisocyanate, trimethylhexamethylene diisocyanate, 1,3 and 1,4-bis(isocyanatemethyl)cyclohexane, xylylene diisocyanate, tetramethylxylylene diisocyanate, hydrogenated xylylene diisocyanate, lysine diisocyanate, isophorone diisocyanate, 4,4'-dicyclohexylmethane diisocyanate, 3,3'-dimethyl-4,4'-dicyclohexylmethane diisocyanate, isomers thereof, and/or combinations thereof.

The polyurethane prepolymer derived from natural oil based polyols could be prepared in the presence of one or more reactive or un-reactive ethylenically unsaturated monomers. Such monomers may further be polymerized.

The polyurethane prepolymer derived from natural oil based polyols may further include a hydrophilic group. The term "hydrophilic group," as used herein, refers to an anionic group (for example, carboxyl group, sulfonic acid group, or phosphoric acid group), or a cationic group (for example, tertiary amino group, or quaternary amino group), or a nonionic hydrophilic group (for example, a group composed of a repeating unit of ethylene oxide, or a group composed of a repeating unit of ethylene oxide and a repeating unit of another alkylene oxide).

Among hydrophilic groups, a nonionic hydrophilic group having a repeating unit of ethylene oxide may, for example, be used. Introduction of a carboxyl group and/or a sulfonic acid group may be effective to make the particle size finer.

When the ionic group is an anionic group, the neutralizer used for neutralization includes, for example, nonvolatile bases such as sodium hydroxide and potassium hydroxide; and volatile bases such as tertiary amines (for example, trimethylamine, triethylamine, dimethylethanolamine, methyldiethanolamine, and triethanolamine) and ammonia can be used.

When the ionic group is a cationic group, usable neutralizer includes, for example, inorganic acids such as hydrochloric acid, sulfuric acid, and nitric acid; and organic acids such as formic acid and acetic acid.

Neutralization may be conducted before, during or after the polymerization of the polyurethane prepolymer derived from natural oil based polyols having an ionic group. The neutralization may be affected by adding the neutralizing agent directly to the polyurethane prepolymer derived from natural oil based polyols or by adding to the aqueous phase during the production of polyurethane dispersion.

Polyurethane prepolymers are typically chain extended via a chain extender. Any chain extender known to be useful to those of ordinary skill in the art of preparing polyurethanes can be used with the present invention. Such chain extenders typically have a molecular weight in the range of from 18 to 500 and have at least two active hydrogen containing groups. Polyamines are an exemplary class of chain extenders. Other materials, particularly water, can function to extend chain length and so are chain extenders for purposes of the present invention. It is particularly preferred that the chain extender is water or a mixture of water and an amine such as, for example, aminated polypropylene glycols such as JEFFAMINE D-400 from Huntsman Chemical Company, amino ethyl piperazine, 2-methyl piperazine, 1,5-diamino-3-methyl-pentane, isophorone diamine, ethylene diamine, diethylene triamine, triethylene tetramine, triethylene pentamine, ethanol amine, lysine in any of its stereoisomeric forms and salts thereof, hexane diamine, hydrazine and piperazine. In the practice of the present invention, the chain extender may be used as a solution of chain extender in water.

The polyurethane dispersion may be produced via a batch process or a continuous process. Polyurethane prepolymer derived from natural oil based polyols, optionally a surfactant, and water are fed into a mixer, for example, an OAKS mixer or an IKA mixer, thereby dispersing the polyurethane prepolymer derived from natural oil based polyols into the water. Subsequently, the dispersed polyurethane prepolymers derived from natural oil based polyols are chain extended with one or more primary or secondary amine to form the polyurethane dispersion.

In one embodiment, the aqueous polyurethane dispersion is made by mixing the prepolymer derived from natural oil based polyols with water, optionally in the presence of a surfactant or other additive and/or phase modifier and/or a chain extender, at a temperature of from 25 to 90° C., to render the desired polyurethane dispersion. The amount of water, and optional chain extender, reacted with the prepolymer is an equivalent amount to the isocyanate functionality in the prepolymer derived from natural oil based polyols. An excess of water may also be used.

In addition to chain extenders, one or more surfactants may be included in the water phase. The surfactant may be anionic, ionic, cationic or zwitterionic or a mixture of monionic with cationic, anionic or zwitterionic. Preferred are nonionic and anionic surfactants. The surfactant, which is not incorporated into the polymer backbone, is selected from the group consisting of metal or ammonia salts of sulfonates, phosphates and carboxylates. Suitable surfactants include alkali metal salts of fatty acids such as sodium stearate, sodium palmitate, potassium oleate, alkali metal salts of fatty acid sulfates such as sodium lauryl sulfate, the alkali metal salts of alkylbenzenesulfones and alkylnaphthalenesulfones such as sodium dodecylbenzenesulfonate, sodium alkylnaphthalene-sulfonate; the alkali metal salts of dialkyl-sulfosuccinates; the alkali metal salts of sulfated alkylphenol ethoxylates such as sodium octylphenoxypolyethoxyethyl sulfate; the alkali metal salts of polyethoxyalcohol sulfates and the alkali metal salts of polyethoxyalkylphenol sulfates. More preferably, the anionic surfactant is sodium dodecyl benzene sulfonate, sodium dodecyl sulfonate, sodium dodecyl diphenyl oxide disulfonate, sodium n-decyl diphenyl oxide disulfonate, isopropylamine dodecylbenzenesulfonate, or sodium hexyl diphenyl oxide disulfonate, and most preferably, the anionic surfactant is sodium dodecyl benzene sulfonate. Preferred nonionic surfactants are ethylene oxide adducts of phenols, such as nonyl phenol. When present, the surfactant typically contains from 0.1 to 6 weight percent of the polyurethane dispersion, most preferably from 0.5 to 4 weight percent. In general, it is desired to add a sufficient amount of surfactant so as to render a dispersion having an average particle size wherein 50 and 1000 nm and a polydispersity of from 1.0 to 2.0. Further, if the prepolymer is self-emulsifying by inclusion of emulsifying nonionic, cationic, or anionic groups, then an external surfactant may or may not be necessary.

Epoxy Dispersion

The second dispersion may comprise an epoxy dispersion. Epoxy resin refers to a composition which possesses one or more vicinal epoxy groups per molecule, that is, at least one 1,2-epoxy group per molecule. In general, such compound is a saturated or unsaturated aliphatic, cycloaliphatic, aromatic or heterocyclic compound which possesses at least one 1,2-epoxy group. Such compound can be substituted, if desired, with one or more non-interfering substituents, such as halogen atoms, hydroxy groups, ether radicals, lower alkyls and the like.

Illustrative epoxies are described in the *Handbook of Epoxy Resins* by H. E. Lee and K. Neville published in 1967 by McGraw-Hill, New York and U.S. Pat. No. 4,066,628, incorporated herein by reference.

Particularly useful compounds which can be used in the practice of the present invention are epoxy resins having the following formula:

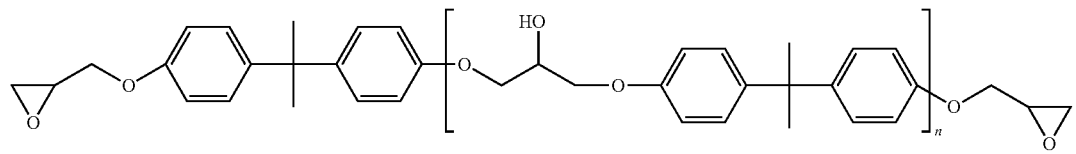

wherein n has an average value of 0 or more.

The epoxy resins useful in the present invention may include, for example, the glycidyl polyethers of polyhydric phenols and polyhydric alcohols. As an illustration, examples of known epoxy resins that may be used in the present invention, include for example, the diglycidyl ethers of resorcinol, catechol, hydroquinone, bisphenol, bisphenol A, bisphenol AP (1,1-bis(4-hydroxylphenyl)-1-phenyl ethane), bisphenol F, bisphenol K, tetrabromobisphenol A, phenol-formaldehyde novolac resins, alkyl substituted phenol-formaldehyde resins, phenol-hydroxybenzaldehyde resins, cresol-hydroxybenzaldehyde resins, dicyclopentadiene-phenol resins, dicyclopentadiene-substituted phenol resins tetramethylbiphenol, tetramethyl-tetrabromobiphenol, tetramethyltribromobiphenol, tetrachlorobisphenol A and any combination thereof.

Examples of diepoxides particularly useful in the present invention include diglycidyl ether of 2,2-bis(4-hydroxyphenyl) propane (generally referred to as bisphenol A) and diglycidyl ether of 2,2-bis(3,5-dibromo-4-hydroxyphenyl) propane (generally referred to as tetrabromobisphenol A). Mixtures of any two or more polyepoxides can also be used in the practice of the present invention.

Other diepoxides which can be employed in the practice of the present invention include the diglycidyl ethers of dihydric phenols, such as those described in U.S. Pat. Nos. 5,246,751; 5,115,075; 5,089,588; 4,480,082 and 4,438,254, all of which are incorporated herein by reference, or the diglycidyl esters of dicarboxylic acids such as those described in U.S. Pat. No. 5,171,820. Other suitable diepoxides include for example, αω-diglycidyloxyisopropylidene-bisphenol-based epoxy resins (commercially known as D.E.R.® 300 and 600 series epoxy resins, products of The Dow Chemical Company, Midland, Mich.).

The epoxy resins which can be employed in the practice of the present invention also include epoxy resins prepared either by reaction of diglycidyl ethers of dihydric phenols with dihydric phenols or by reaction of dihydric phenols with epichlorohydrin (also known as "taffy resins").

Exemplary epoxy resins include, for example, the diglycidyl ethers of bisphenol A; 4,4'-sulfonyldiphenol; 4,4-oxydiphenol; 4,4'-dihydroxybenzophenone; resorcinol; hydroquinone; 9,9'-bis(4-hydroxyphenyl)fluorene; 4,4'-dihydroxybiphenyl or 4,4'-dihydroxy-α-methylstilbene and the diglycidyl esters of the dicarboxylic acids.

Other useful epoxide compounds which can be used in the practice of the present invention are cycloaliphatic epoxides. A cycloaliphatic epoxide consists of a saturated carbon ring having an epoxy oxygen bonded to two vicinal atoms in the carbon ring for example as illustrated by the following general formula:

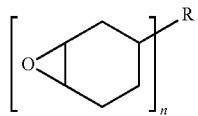

wherein R is a hydrocarbon group optionally comprising one or more heteroatoms (such as, without limitation thereto Cl, Br, and S), or an atom or group of atoms forming a stable bond with carbon (such as, without limitation thereto, Si, P and B) and wherein n is greater than or equal to 1.

The cycloaliphatic epoxide may be a monoepoxide, a diepoxide, a polyepoxide, or a mixture of those. For example, any of the cycloaliphatic epoxide described in U.S. Pat. No. 3,686,359, incorporated herein by reference, may be used in the present invention. As an illustration, the cycloaliphatic epoxides that may be used in the present invention include, for example, (3,4-epoxycyclohexylmethyl)-3,4-epoxy-cyclohexane carboxylate, bis-(3,4-epoxycyclohexyl) adipate, vinylcyclohexene monoxide and mixtures thereof.

Polymeric Based Dispersions

The second dispersion may comprise a polymeric based dispersion such as a polyolefin dispersion. The polymeric dispersion may comprise (a) at least one or more base polymers, (b) optionally one or more surfactants, and (c) a fluid medium.

(a) Base Polymer

The polymeric based dispersion comprises from 5 to 99 percent by weight of one or more base polymers, based on the total weight of the solid content of the polymeric based dispersion. All individual values and subranges from 5 to 99 weight percent are included herein and disclosed herein; for example, the weight percent can be from a lower limit of 5, 8, 10, 15, 20, 25 weight percent to an upper limit of 40, 50, 60, 70, 80, 90, 95, or 99 weight percent. For example, the polymeric based dispersion may comprise from 15 to 99; or in the alternative from 15 to 90; or in the alternative from 15 to 80 percent, by weight of one or more base polymers, based on the total weight of the solid content of the polymeric based dispersion. The polymeric based dispersion comprises at least one or more base polymers. The base polymer may, for example, be selected from the group consisting of a thermoplastic material, and a thermoset material. The one or more base polymers may comprise one or more olefin based polymers, one or more acrylic based polymers, one or more polyester based polymers, one or more solid epoxy polymers, one or more thermoplastic polyurethane polymers, one or more styrenic based polymers, or combinations thereof.

Examples of thermoplastic materials include, but are not limited to, homopolymers and copolymers (including elastomers) of an alpha-olefins such as ethylene, propylene, 1-butene, 3-methyl-1-butene, 4-methyl-1-pentene, 3-methyl-1-pentene, 1-heptene, 1-hexene, 1-octene, 1-decene, and 1-dodecene, as typically represented by polyethylene, polypropylene, poly-1-butene, poly-3-methyl-1-butene, poly-3-methyl-1-pentene, poly-4-methyl-1-pentene, ethylene-propylene copolymer, ethylene-1-butene copolymer, and propylene-1-butene copolymer; copolymers (including elastomers) of an alpha-olefin with a conjugated or non-conjugated diene, as typically represented by ethylene-butadiene copolymer and ethylene-ethylidene norbornene copolymer; and polyolefins (including elastomers) such as copolymers of two or more alpha-olefins with a conjugated or non-conjugated diene, as typically represented by ethylene-propylene-butadiene copolymer, ethylene-propylene-dicyclopentadiene copolymer, ethylene-propylene-1,5-hexadiene copolymer, and ethylene-propylene-ethylidene norbornene copolymer; ethylene-vinyl compound copolymers such as ethylene-vinyl acetate copolymer, ethylene-vinyl alcohol copolymer, ethylene-vinyl chloride copolymer, ethylene acrylic acid or ethylene-(meth)acrylic acid copolymers, and ethylene-(meth)acrylate copolymer; styrenic copolymers (including elastomers) such as polystyrene, ABS, acrylonitrile-styrene copolymer, α-methylstyrene-styrene copolymer, styrene vinyl alcohol, styrene acrylates such as styrene methylacrylate, styrene butyl acrylate, styrene butyl methacrylate, and styrene butadienes and crosslinked styrene polymers; and styrene block copolymers (including elastomers) such as styrene-butadiene copolymer and hydrate thereof, and styrene-isoprene-styrene triblock copolymer; polyvinyl compounds such as polyvinyl chloride, polyvinylidene chloride, vinyl chloride-vinylidene chloride copolymer, polymethyl acrylate, and polymethyl methacrylate; polyamides such as nylon 6, nylon 6,6, and nylon 12; thermoplastic polyesters such as polyethylene terephthalate and polybutylene terephthalate; polycarbonate, polyphenylene oxide, and the like; and glassy hydrocarbon-based resins, including poly-dicyclopentadiene polymers and related polymers (copolymers, terpolymers); saturated mono-olefins such as vinyl acetate, vinyl propionate, vinyl versatate, and vinyl butyrate and the like; vinyl esters such as esters of monocarboxylic acids, including methyl acrylate, ethyl acrylate, n-butyl acrylate, isobutyl acrylate, 2-ethylhexyl acrylate, dodecyl acrylate, n-octyl acrylate, phenyl acrylate, methyl methacrylate, ethyl methacrylate, and butyl methacrylate and the like; acrylonitrile, methacrylonitrile, acrylamide, mixtures thereof; resins produced by ring opening metathesis and cross metathesis polymerization and the like. These resins may be used either alone or in combinations of two or more.

Examples of suitable (meth)acrylates, as base polymers, include methyl acrylate, ethyl acrylate, butyl acrylate, hexyl acrylate, 2-ethylhexyl acrylate, octyl acrylate and isooctyl acrylate, n-decyl acrylate, isodecyl acrylate, tert-butyl acrylate, methyl methacrylate, butyl methacrylate, hexyl methacrylate, isobutyl methacrylate, isopropyl methacrylate as well as 2-hydroxyethyl acrylate and acrylamide. The preferred (meth)acrylates are methyl acrylate, ethyl acrylate, butyl acrylate, 2-ethylhexyl acrylate, octyl acrylate, isooctyl acrylate, methyl methacrylate and butyl methacrylate. Other suitable (meth)acrylates that can be polymerized from monomers include lower alkyl acrylates and methacrylates including acrylic and methacrylic ester monomers: methyl acrylate, ethyl acrylate, n-butyl acrylate, t-butyl acrylate, 2-ethylhexyl acrylate, decyl acrylate, isobornyl acrylate, methyl methacrylate, ethyl methacrylate, n-propyl methacrylate, isopropyl methacrylate, n-butyl methacrylate, isobutyl methacrylate, sec-butyl methacrylate, cyclohexyl methacrylate, isodecyl methacrylate, isobornyl methacrylate, t-butylaminoethyl methacrylate, stearyl methacrylate, glycidyl methacrylate, dicyclopentenyl methacrylate, phenyl methacrylate.

In selected embodiments, base polymer may, for example, comprise a polyolefin selected from the group consisting of ethylene-alpha olefin copolymers, and propylene-alpha olefin copolymers. In particular, in select embodiments, the base polymer may comprise one or more non-polar polyolefins.

In specific embodiments, polyolefins such as polypropylene, polyethylene, copolymers thereof, and blends thereof, as well as ethylene-propylene-diene terpolymers, may be used. In some embodiments, preferred olefinic polymers include homogeneous polymers, as described in U.S. Pat. No. 3,645,992 issued to Elston; high density polyethylene (HDPE), as described in U.S. Pat. No. 4,076,698 issued to Anderson; heterogeneously branched linear low density polyethylene (LLDPE); heterogeneously branched ultra low linear density polyethylene (ULDPE); homogeneously branched, linear ethylene/alpha-olefin copolymers; homogeneously branched, substantially linear ethylene/alpha-olefin polymers, which can be prepared, for example, by processes disclosed in U.S. Pat. Nos. 5,272,236 and 5,278,272, the disclosures of which are incorporated herein by reference; and high pressure, free radical polymerized ethylene polymers and copolymers such as low density polyethylene (LDPE) or ethylene vinyl acetate polymers (EVA).

In other particular embodiments, the base polymer may, for example, be ethylene vinyl acetate (EVA) based polymers. In other embodiments, the base polymer may, for example, be ethylene-methyl acrylate (EMA) based polymers. In other particular embodiments, the ethylene-alpha olefin copolymer may, for example, be ethylene-butene, ethylene-hexene, or ethylene-octene copolymers or interpolymers. In other particular embodiments, the propylene-alpha olefin copolymer may, for example, be a propylene-ethylene or a propylene-ethylene-butene copolymer or interpolymer.

In certain other embodiments, the base polymer may, for example, be a semi-crystalline polymer and may have a melting point of less than 110° C. In preferred embodiments, the melting point may be from 25 to 100° C. In more preferred embodiments, the melting point may be between 40 and 85° C.

In one particular embodiment, the base polymer is a propylene/alpha-olefin copolymer, which is characterized as having substantially isotactic propylene sequences. "Substantially isotactic propylene sequences" means that the sequences have an isotactic triad (mm) measured by $^{13}$C NMR of greater than about 0.85; in the alternative, greater than about 0.90; in another alternative, greater than about 0.92; and in another alternative, greater than about 0.93. Isotactic triads are well-known in the art and are described in, for example, U.S. Pat. No. 5,504,172 and International Publication No. WO 00/01745, which refer to the isotactic sequence in terms of a triad unit in the copolymer molecular chain determined by $^{13}$C NMR spectra.

The propylene/alpha-olefin copolymer may have a melt flow rate in the range of from 0.1 to 15 g/10 minutes, measured in accordance with ASTM D-1238 (at 230° C./2.16 Kg). All individual values and subranges from 0.1 to 15 g/10 minutes are included herein and disclosed herein; for example, the melt flow rate can be from a lower limit of 0.1 g/10 minutes, 0.2 g/10 minutes, or 0.5 g/10 minutes to an upper limit of 15 g/10 minutes, 10 g/10 minutes, 8 g/10 minutes, or 5 g/10 minutes. For example, the propylene/alpha-olefin copolymer may have a melt flow rate in the range of 0.1 to 10 g/10 minutes; or in the alternative, the propylene/alpha-olefin copolymer may have a melt flow rate in the range of 0.2 to 10 g/10 minutes.

The propylene/alpha-olefin copolymer has a crystallinity in the range of from at least 1 percent by weight (a heat of fusion of at least 2 Joules/gram) to 30 percent by weight (a heat of fusion of less than 50 Joules/gram). All individual values and subranges from 1 percent by weight (a heat of fusion of at least 2 Joules/gram) to 30 percent by weight (a heat of fusion of less than 50 Joules/gram) are included herein and disclosed herein; for example, the crystallinity can be from a lower limit of 1 percent by weight (a heat of fusion of at least 2 Joules/gram), 2.5 percent (a heat of fusion of at least 4 Joules/gram), or 3 percent (a heat of fusion of at least 5 Joules/gram) to an upper limit of 30 percent by weight (a heat of fusion of less than 50 Joules/gram), 24 percent by weight (a heat of fusion of less than 40 Joules/gram), 15 percent by weight (a heat of fusion of less than 24.8 Joules/gram) or 7 percent by weight (a heat of fusion of less than 11 Joules/gram). For example, the propylene/alpha-olefin copolymer may have a crystallinity in the range of from at least 1 percent by weight (a heat of fusion of at least 2 Joules/gram) to 24 percent by weight (a heat of fusion of less than 40 Joules/gram); or in the alternative, the propylene/alpha-olefin copolymer may have a crystallinity in the range of from at least 1 percent by weight (a heat of fusion of at least 2 Joules/gram) to 15 percent by weight (a heat of fusion of less than 24.8 Joules/gram); or in the alternative, the propylene/alpha-olefin copolymer may have a crystallinity in the range of from at least 1 percent by weight (a heat of fusion of at least 2 Joules/gram) to 7 percent by weight (a heat of fusion of less than 11 Joules/gram); or in the alternative, the propylene/alpha-olefin copolymer may have a crystallinity in the range of from at least 1 percent by weight (a heat of fusion of at least 2 Joules/gram) to 5 percent by weight (a heat of fusion of less than 8.3 Joules/gram). The crystallinity is measured via DSC method, as described above. The propylene/alpha-olefin copolymer comprises units derived from propylene and polymeric units derived from one or more alpha-olefin comonomers. Exemplary comonomers utilized to manufacture the propylene/alpha-olefin copolymer are $C_2$, and $C_4$ to $C_{10}$ alpha-olefins; for example, $C_2$, $C_4$, $C_6$ and $C_8$ alpha-olefins.

The propylene/alpha-olefin copolymer comprises from 1 to 40 percent by weight of one or more alpha-olefin comonomers. All individual values and subranges from 1 to 40 weight percent are included herein and disclosed herein; for example, the comonomer content can be from a lower limit of 1 weight percent, 3 weight percent, 4 weight percent, 5 weight percent, 7 weight percent, or 9 weight percent to an upper limit of 40 weight percent, 35 weight percent, 30 weight percent, 27 weight percent, 20 weight percent, 15 weight percent, 12 weight percent, or 9 weight percent. For example, the propylene/alpha-olefin copolymer comprises from 1 to 35 percent by weight of one or more alpha-olefin comonomers; or in the alternative, the propylene/alpha-olefin copolymer comprises from 1 to 30 percent by weight of one or more alpha-olefin comonomers; or in the alternative, the propylene/alpha-olefin copolymer comprises from 3 to 27 percent by weight of one or more alpha-olefin comonomers; or in the alternative, the propylene/alpha-olefin copolymer comprises from 3 to 20 percent by weight of one or more alpha-olefin comonomers; or in the alternative, the propylene/alpha-olefin copolymer comprises from 3 to 15 percent by weight of one or more alpha-olefin comonomers.

The propylene/alpha-olefin copolymer has a molecular weight distribution (MWD), defined as weight average molecular weight divided by number average molecular weight ($M_w/M_n$) of 3.5 or less; in the alternative 3.0 or less; or in another alternative from 1.8 to 3.0.

Such propylene/alpha-olefin copolymers are further described in details in the U.S. Pat. Nos. 6,960,635 and 6,525,157, incorporated herein by reference. Such propylene/alpha-olefin copolymers are commercially available from The Dow Chemical Company, under the tradename VERSIFY™, or from ExxonMobil Chemical Company, under the tradename VISTAMAXX™.

In one embodiment, the propylene/alpha-olefin copolymers are further characterized as comprising (A) between 60 and less than 100, preferably between 80 and 99 and more preferably between 85 and 99, weight percent units derived from propylene, and (B) between greater than zero and 40, preferably between 1 and 20, more preferably between 4 and 16 and even more preferably between 4 and 15, weight percent units derived from at least one of ethylene and/or a $C_{4-10}$ α-olefin; and containing an average of at least 0.001, preferably an average of at least 0.005 and more preferably an average of at least 0.01, long chain branches/1000 total carbons. The maximum number of long chain branches in the propylene interpolymer is not critical to the definition of this invention, but typically it does not exceed 3 long chain branches/1000 total carbons. The term long chain branch, as used herein, refers to a chain length of at least one (1) carbon more than a short chain branch, and short chain branch, as used herein, refers to a chain length of two (2) carbons less than the number of carbons in the comonomer. For example, a propylene/1-octene interpolymer has backbones with long chain branches of at least seven (7) carbons in length, but these backbones also have short chain branches of only six (6) carbons in length. Such propylene/alpha-olefin copolymers are further described in details in the U.S. Provisional Patent Application No. 60/988,999 and International Patent Application No. PCT/US08/082,599, each of which is incorporated herein by reference.

In certain other embodiments, the base polymer, for example, propylene/alpha-olefin copolymer, may, for example, be a semi-crystalline polymer and may have a melting point of less than 110° C. In preferred embodiments, the melting point may be from 25 to 100° C. In more preferred embodiments, the melting point may be between 40 and 85° C.

In other selected embodiments, olefin block copolymers, for example, ethylene multi-block copolymer, such as those described in the International Publication No. WO2005/090427 and U.S. patent application Ser. No. 11/376,835 may be used as the base polymer. Such olefin block copolymer may be an ethylene/α-olefin interpolymer:

(a) having a $M_w/M_n$ from 1.7 to 3.5, at least one melting point, $T_m$, in degrees Celsius, and a density, d, in grams/cubic centimeter, wherein the numerical values of $T_m$ and d corresponding to the relationship:

$$T_m > -2002.9 + 4538.5(d) - 2422.2(d)^2; \text{ or}$$

(b) having a $M_w/M_n$ from 1.7 to 3.5, and being characterized by a heat of fusion, ΔH in J/g, and a delta quantity, ΔT, in degrees Celsius defined as the temperature difference between the tallest DSC peak and the tallest CRYSTAF peak, wherein the numerical values of ΔT and ΔH having the following relationships:

$$\Delta T > -0.1299(\Delta H) + 62.81 \text{ for } \Delta H \text{ greater than zero and up to 130 J/g,}$$

$$\Delta T \geq 48° \text{ C. for } \Delta H \text{ greater than 130 J/g,}$$

wherein the CRYSTAF peak being determined using at least 5 percent of the cumulative polymer, and if less than 5 percent of the polymer having an identifiable CRYSTAF peak, then the CRYSTAF temperature being 30° C.; or (c) being characterized by an elastic recovery, Re, in percent at 300 percent strain and 1 cycle measured with a compression-molded film of the ethylene/α-olefin interpolymer, and having a density, d, in grams/cubic centimeter, wherein the numerical values of Re and d satisfying the following relationship when ethylene/α-olefin interpolymer being substantially free of a cross-linked phase:

$$Re > 1481 - 1629(d); \text{ or}$$

(d) having a molecular fraction which elutes between 40° C. and 130° C. when fractionated using TREF, characterized in that the fraction having a molar comonomer content of at least 5 percent higher than that of a comparable random ethylene interpolymer fraction eluting between the same temperatures, wherein said comparable random ethylene interpolymer having the same comonomer(s) and having a melt index, density, and molar comonomer content (based on the whole polymer) within 10 percent of that of the ethylene/α-olefin interpolymer; or (e) having a storage modulus at 25° C., G' (25° C.), and a storage modulus at 100° C., G' (100° C.), wherein the ratio of G' (25° C.) to G' (100° C.) being in the range of 1:1 to 9:1.

The ethylene/α-olefin interpolymer may also:

(a) have a molecular fraction which elutes between 40° C. and 130° C. when fractionated using TREF, characterized in that the fraction having a block index of at least 0.5 and up to about 1 and a molecular weight distribution, $M_w/M_n$, greater than about 1.3; or (b) have an average block index greater than zero and up to about 1.0 and a molecular weight distribution, $M_w/M_n$, greater than about 1.3.

In certain embodiments, the base polymer may, for example, comprise a polar polymer, having a polar group as either a comonomer or grafted monomer. In exemplary embodiments, the base polymer may, for example, comprise one or more polar polyolefins, having a polar group as either a comonomer or grafted monomer. Exemplary polar polyolefins include, but are not limited to, ethylene-acrylic acid (EAA) and ethylene-methacrylic acid copolymers, such as those available under the trademarks PRIMACOR™, commercially available from The Dow Chemical Company, NUCREL™, commercially available from E.I. DuPont de Nemours, and ESCOR™, commercially available from ExxonMobil Chemical Company and described in U.S. Pat. Nos. 4,599,392, 4,988,781, and 5,938,437, each of which is incorporated herein by reference in its entirety. Other exemplary base polymers include, but are not limited to, ethylene ethyl acrylate (EEA) copolymer, ethylene methyl methacrylate (EMMA), and ethylene butyl acrylate (EBA).

In one embodiment, the base polymer may, for example, comprise a polar polyolefin selected from the group consisting of ethylene-acrylic acid (EAA) copolymer, ethylene-methacrylic acid copolymer, and combinations thereof, and the stabilizing agent may, for example, comprise a polar polyolefin selected from the group consisting of ethylene-acrylic acid (EAA) copolymer, ethylene-methacrylic acid copolymer, and combinations thereof; provided, however, that base polymer may, for example, have a lower acid number, measured according to ASTM-D 974, that the stabilizing agent.

In certain embodiments, the base polymer may, for example, comprise a polyester resin. Polyester resin refers to thermoplastic resins that may include polymers containing at least one ester bond. For example, polyester polyols may be prepared via a conventional esterification process using a molar excess of an aliphatic diol or glycol with relation to an alkanedioic acid. Illustrative of the glycols that can be employed to prepare the polyesters are ethylene glycol, diethylene glycol, propylene glycol, dipropylene glycol, 1,3-propanediol, 1,4-butanediol and other butanediols, 1,5-pentanediol and other pentane diols, hexanediols, decanediols, and dodecanediols. In some embodiments, the aliphatic glycol may contain from 2 to 8 carbon atoms. Illustrative of the dioic acids that may be used to prepare the polyesters are maleic acid, malonic acid, succinic acid, glutaric acid, adipic acid, 2-methyl-1,6-hexanoic acid, pimelic acid, suberic acid, and dodecanedioic acids. In some embodiments, the alkanedioic acids may contain from 4 to 12 carbon atoms. Illustrative of the polyester polyols are poly(hexanediol adipate), poly(butylene glycol adipate), poly(ethylene glycol adipate), poly(diethylene glycol adipate), poly(hexanediol oxalate), and poly(ethylene glycol sebecate). Other embodiments of the present invention use polyester resins containing aliphatic diols such as UNOXOL (a mixture of cis and trans 1,3- and 1,4-cyclohexanedimethanol) available from The Dow Chemical Company (Midland, Mich.).

In certain embodiments, the base polymer may, for example, comprise a thermoset material comprising an epoxy resin, as described hereinabove.

In certain embodiments, the base polymer comprises a thermoplastic polyurethane polymer. Such thermoplastic polyurethane polymers are generally know, and further described, for example, in the International Publication No. 2008/057878, incorporated herein by reference to the extent that it describes a thermoplastic polyurethane polymer.

Those having ordinary skill in the art will recognize that the above list is a non-comprehensive listing of exemplary base polymers. It will be appreciated that the scope of the present invention is restricted by the claims only.

(b) Stabilizing Agent

The polymeric based dispersion may further comprise at least one or more stabilizing agents, also referred to herein as dispersion or dispersing agents, to promote the formation of a stable polymeric based dispersion. The stabilizing agent may preferably be an external stabilizing agent. The polymeric based dispersion of the instant invention comprises 1 to 50 percent by weight of one or more stabilizing agents, based on the total weight of the solid content of the dispersion. All individual values and subranges from 1 to 45 weight percent are included herein and disclosed herein; for example, the weight percent can be from a lower limit of 1, 3, 5, 10 weight percent to an upper limit of 15, 25, 35, 45, or 50 weight percent. For example, the dispersion may comprise from 1 to 25; or in the alternative from 1 to 35; or in the alternative from 1 to 40; or in the alternative from 1 to 45, percent by weight of one or more stabilizing agents, based on the total weight of the solid content of the dispersion. In selected embodiments, the stabilizing agent may be a surfactant, a polymer, or mixtures thereof. In certain embodiments, the stabilizing agent can be a polar polymer, having a polar group as either a comonomer or grafted monomer. In exemplary embodiments, the stabilizing agent comprises one or more polar polyolefins, having a polar group as either a comonomer or grafted monomer. Exemplary polymeric stabilizing agents include, but are not limited to, ethylene-acrylic acid (EAA) and ethylene-methacrylic acid copolymers, such as those available under the trademarks PRIMACOR™, commercially available from The Dow Chemical Company, NUCREL™, commercially available from E.I. DuPont de Nemours, and ESCOR™, commercially available from ExxonMobil Chemical Company and described in U.S. Pat. Nos. 4,599,392, 4,988,781, and 5,938,437, each of which is incorporated herein by reference in its entirety. Other exemplary polymeric stabilizing agents include, but are not limited to, ethylene ethyl acrylate (EEA) copolymer, ethylene methyl methacrylate (EMMA), and ethylene butyl acrylate (EBA). Other ethylene-carboxylic acid copolymer may also be used. Those having ordinary skill in the art will recognize that a number of other useful polymers may also be used.

Other stabilizing agents that may be used include, but are not limited to, long chain fatty acids, fatty acid salts, or fatty acid alkyl esters having from 12 to 60 carbon atoms. In other embodiments, the long chain fatty acid or fatty acid salt may have from 12 to 40 carbon atoms.

The stabilizing agent may be partially or fully neutralized with a neutralizing agent. In certain embodiments, neutralization of the stabilizing agent, such as a long chain fatty acid or EAA, may be from 25 to 200 percent on a molar basis; or in the alternative, it may be from 50 to 110 percent on a molar basis. For example, for EAA, the neutralizing agent may be a base, such as ammonium hydroxide or potassium hydroxide, for example. Other neutralizing agents can include lithium hydroxide or sodium hydroxide, for example. In another alternative, the neutralizing agent may, for example, be a carbonate. In another alternative, the neutralizing agent may, for example, be any amine such as monoethanolamine, or 2-amino-2-methyl-1-propanol (AMP). Amines useful in embodiments disclosed herein may include monoethanolamine, diethanolamine, triethanolamine, and TRIS AMINO (each available from Angus), NEUTROL TE (available from BASF), as well as triisopropanolamine, diisopropanolamine, and N,N-dimethylethanolamine (each available from The Dow Chemical Company, Midland, Mich.). Other useful amines may include ammonia, monomethylamine, dimethylamine, trimethylamine, monoethylamine, diethylamine, triethylamine, mono-n-propylamine, dimethyl-n propylamine, N-methanol amine, N-aminoethylethanolamine, N-methyldiethanolamine, monoisopropanolamine, N,N-dimethyl propanolamine, 2-amino-2-methyl-1-propanol, tris(hydroxymethyl)-aminomethane, N,N,N'N'-tetrakis(2-hydroxylpropyl) ethylenediamine, 1,2-diaminopropane. In some embodiments, mixtures of amines or mixtures of amines and surfactants may be used. Those having ordinary skill in the art will appreciate that the selection of an appropriate neutralizing agent depends on the specific composition formulated, and that such a choice is within the knowledge of those of ordinary skill in the art.

Additional stabilizing agents that may be useful in the practice of the present invention include, but are not limited to, cationic surfactants, anionic surfactants, or non-ionic surfactants. Examples of anionic surfactants include, but are not limited to, sulfonates, carboxylates, and phosphates. Examples of cationic surfactants include, but are not limited to, quaternary amines. Examples of non-ionic surfactants include, but are not limited to, block copolymers containing ethylene oxide and silicone surfactants. Stabilizing agents useful in the practice of the present invention can be either external surfactants or internal surfactants. External surfactants are surfactants that do not become chemically reacted into the base polymer during dispersion preparation. Examples of external surfactants useful herein include, but are not limited to, salts of dodecyl benzene sulfonic acid and lauryl sulfonic acid salt. Internal surfactants are surfactants that do become chemically reacted into the base polymer during dispersion preparation. An example of an internal surfactant useful herein includes 2,2-dimethylol propionic acid and its salts. Additional surfactants that may be useful in the practice of the present invention include cationic surfactants, anionic surfactants, non-ionic surfactants, or combinations thereof. Various commercially available surfactants may be used in embodiments disclosed herein, including: OP-100 (a sodium stearate), OPK-1000 (a potassium stearate), and OPK-181 (a potassium oleate), each available from RTD Hallstar; UNICID 350, available from Baker Petrolite; DISPONIL FES 77-IS and DISPONIL TA-430, each available from Cognis; RHODAPEX CO-436, SOPROPHOR 4D384, 3D-33, and 796/P, RHODACAL BX-78 and LDS-22, RHODAFAC RE-610, and RM-710, and SUPRAGIL MNS/90, each available from Rhodia; and TRITON QS-15, TRITON W-30, DOWFAX 2A1, DOWFAX 3B2, DOWFAX 8390, DOWFAX C6L, TRITON X-200, TRITON XN-45S, TRITON H-55, TRITON GR-5M, TRITON BG-10, and TRITON CG-110, each available from The Dow Chemical Company, Midland, Mich.

(c) Fluid Medium

The polymeric based dispersion further comprises a fluid medium. The fluid medium may be any medium; for example, the fluid medium may be water. The polymeric based dispersion of the instant invention comprises 25 to 90 percent by weight of fluid medium, based on the total weight of the dispersion. In particular embodiments, the water content may be in the range of from 35 to 75, or in the alternative from 35 to 70, or in the alternative from 45 to 60 percent by weight, based on the total weight of the dispersion. Water content of the polymeric based dispersion may preferably be controlled so that the solids content (base polymer plus stabilizing agent) is between 1 percent to 74 percent by weight. In particular embodiments, the solids range may be between 10 percent to 70 percent by weight. In other particular embodiments, the solids range is between 20 percent to 65 percent by weight. In certain other embodiments, the solids range is between 25 percent to 55 percent by weight.

(d) Additional Components

The polymeric based dispersion may further comprise one or more binder compositions such as acrylic latex, vinyl acrylic latex, styrene acrylic latex, vinyl acetate ethylene latex, and combinations thereof; optionally one or more fillers; optionally one or more additives; optionally one or more pigments, for example, titanium dioxide, mica, calcium carbonate, silica, zinc oxide, milled glass, aluminum trihydrate, talc, antimony trioxide, fly ash, and clay; optionally one or more co-solvents, for example, glycols, glycol ether, 2,2,4-trimethyl-1,3-pentanediol monoisobutyrate, alcohols, mineral spirits, and benzoate esters; optionally one or more dispersants, for example, aminoalcohols, and polycarboxylates; optionally one or more surfactants; optionally one or more defoamers; optionally one or more preservatives, for example, biocides, mildewcides, fungicides, algaecides, and combinations thereof; optionally one or more thickeners, for example, cellulosic based thickeners such as hydroxyethyl cellulose, hydrophobically modified alkali soluble emulsions (HASE thickeners such as UCAR POLYPHOBE TR-116) and hydroobically modified ethoxylated urethane thickeners (HEUR); or optionally one or more additional neutralizing agents, for example, hydroxides, amines, ammonia, and carbonates.

(e) Additional Colorant Components

The polymeric based dispersion may further comprise a colorant as part of the polyolefin dispersion. A variety of colors may be used. Examples include colors such as yellow, magenta, and cyan. As a black coloring agent, carbon black, and a coloring agent toned to black using the yellow/magenta/cyan coloring agents shown below may be used. Colorants, as used herein, include dyes, pigments, and pre-dispersions, among others. These colorants may be used singly, in a mixture, or as a solid solution. In various embodiments, pigments may be provided in the form of raw pigments, treated pigments, pre-milled pigments, pigment powders, pigment presscakes, pigment masterbatches, recycled pigment, and solid or liquid pigment pre-dispersions. As used herein, a raw pigment is a pigment particle that has had no wet treatments applied to its surface, such as to deposit various coatings on the surface. Raw pigment and treated pigment are further discussed in PCT Publication No. WO 2005/095277 and U.S. Patent Application Publication No. 20060078485, the relevant portions of which are incorporated herein by reference. In contrast, a treated pigment may have undergone wet treatment, such as to provide metal oxide coatings on the particle surfaces. Examples of metal oxide coatings include alumina, silica, and zirconia. Recycled pigment may also be used as the starting pigment particles, where recycled pigment is pigment after wet treatment of insufficient quality to be sold as coated pigment.

Exemplary colorant particles include, but are not limited to, pigments such as yellow coloring agent, compounds typified by a condensed azo compound, an isoindolynone compound, an anthraquinone compound, an azometal complex methine compound, and an allylamide compound as pigments may be used. As a magenta coloring agent, a condensed azo compound, a diketopyrrolopyrrole compound, anthraquinone, a quinacridone compound, a base dye lake compound, a naphthol compound, a benzimidazolone compound, a thioindigo compound, and a perylene compound may be used. As a cyan coloring agent, a copper phthalocyanine compound and its derivative, an anthraquinone compound, a base dye lake compound, and the like may be used.

(f) Forming the Polymeric Based Dispersion

The polymeric based dispersion can be formed by any number of methods recognized by those having skill in the art. In one embodiment, one or more base polymers, one or more stabilizing agents are melt-kneaded in an extruder along with water and a neutralizing agent, such as ammonia, potassium hydroxide, or a combination of the two to form a polymeric based dispersion. In another embodiment, one or more base polymers and optionally one or more fillers are compounded, and then the base polymer/filler compound is melt-kneaded in an extruder in the presence of an optional stabilizing agent, water, and one or more neutralizing agents thereby forming a polymeric based dispersion. In some embodiments, the dispersion is first diluted to contain 1 to 3 percent by weight water and then, subsequently, further diluted to comprise greater than about 25 percent by weight water.

Any melt-kneading means known in the art may be used. In some embodiments, a kneader, a BANBURY® mixer, single-screw extruder, or a multi-screw extruder, for example, a twin screw extruder, is used. A process for producing the dispersions in accordance with the present invention is not particularly limited. For example, an extruder, in certain embodiments, for example, a twin screw extruder, is coupled to a back pressure regulator, melt pump, or gear pump. Exemplary embodiments also provide a base reservoir and an initial water reservoir, each of which includes a pump. Desired amounts of base and initial water are provided from the base reservoir and the initial water reservoir, respectively. Any suitable pump may be used, but in some embodiments, for example, a pump that provides a flow of about 150 cc/min at a pressure of 240 bar is used to provide the base and the initial water to the extruder. In other embodiments, a liquid injection pump provides a flow of 300 cc/min at 200 bar or 600 cc/min at 133 bar. In some embodiments, the base and initial water are preheated in a preheater.

One or more base polymers, in the form of pellets, powder, or flakes, are fed from the feeder to an inlet of the extruder where the resin is melted or compounded. Optionally one or more fillers may be fed simultaneously with one or more base polymers into the extruder via the feeder; or in the alternative, one or more fillers may be compounded into one or more base polymers, and then fed into the extruder via the feeder. In the alternative, additional one or more fillers may further be metered via an inlet prior to the emulsification zone into the molten compound comprising one or more base polymers and optionally one or more fillers. In some embodiments, the dispersing agent is added to one or more base polymers through and along with the resin and in other embodiments, the dispersing agent is provided separately to the twin screw extruder. The resin melt is then delivered from the mix and convey zone to an emulsification zone of the extruder where the initial amount of water and base from the water and base reservoirs are added through an inlet. In some embodiments, dispersing agent may be added additionally or exclusively to the water stream. In some embodiments, further dilution water may be added via water inlet from water reservoir in a dilution and cooling zone of the extruder. Typically, the dispersion is diluted to at least 30 weight percent water in the cooling zone. In addition, the diluted mixture may be diluted any number of times until the desired dilution level is achieved. In some embodiments, water is not added into the twin screw extruder but rather to a stream containing the resin melt after the melt has exited from the extruder. In this manner, steam pressure build-up in the extruder is eliminated and the dispersion is formed in a secondary mixing device such as a rotor stator mixer.

Emulsion Polymer Latex

The second emulsion may be an emulsion polymer latex selected from the group consisting of acrylic latex, vinyl acetate acrylic latex, styrene acrylic latex, vinyl acetate ethylene latex, and combinations thereof. Such emulsion polymer latex may comprise at least one synthetic latex. A synthetic latex is generally known as an aqueous dispersion of polymer particles prepared by emulsion polymerization of one or more monomers. The latex can have a monomodal or polymodal, for example, bimodal, particle size distribution. Mixtures or blends of latexes can be employed.

In one embodiment of the invention, the polymer of the latex is a copolymer, that is, a polymer formed from at least 2 monomers. The latex may contain a single copolymer or more than one copolymer. Advantageously, the polymer of the latex has a glass transition temperature (Tg) of from −50° C. to 100° C.

The copolymers that are useful alone, as opposed to those useful only in a blend, in the practice of this invention desirably have a Tg of no lower than about −10° C., preferably at least about 0° C. Desirably, the Tg of the copolymer is no higher than about 50° C., preferably up to about 40° C. The generally preferred range is from 0° C. to 40° C. The Tg of the copolymer of the composition of this invention is determined by differential scanning calorimetry (DSC).

While a wide range of monomeric compositions are useful for the latex component of major component of this invention, in a particular embodiment it is preferred that the copolymer is uncrosslinked by virtue of there being no crosslinking monomers present in the group of ethylenically unsaturated monomers present in the polymerization mixture from which it is prepared. That is, it is desirable in this embodiment that the copolymer be produced by polymerization in the absence of crosslinking monomers or some other crosslinking agent.

In an alternative embodiment, it is desirable for the copolymer to be lightly crosslinked. This may be accomplished by the inclusion in the polymerization mixture from which the copolymer is prepared of a monomer that is multifunctional and of known utility as a crosslinker, such as, for example, divinyl benzene or allyl (meth)acrylate. In this particular embodiment, it is preferred that the content of crosslinking monomers in the copolymer is no more than about 2 weight percent, preferably from 0.001 to 2 weight percent, more preferably from 0.01 to 1.5 weight percent, still more preferably from 0.1 to 1 weight percent, where the weight percentages are based on the total weight of monomers in the polymerization mixture.

A wide variety of monomers may be used to prepare copolymers suitable for use in the major component of this invention. (Meth)acrylate copolymers comprising primarily (meth)acrylate monomers are one desirable type of copolymer.

For the purposes of the emulsion polymer latex of the present invention, the term "(meth)" indicates that the methyl substituted compound is included in the class of compounds modified by that term. For example, the term (meth)acrylic acid represents acrylic acid and methacrylic acid.

With reference the emulsion polymer latex of the present invention, as used herein the term "(meth)acrylate copolymer" means a copolymer that contains in polymerized form at least 80 weight percent (meth)acrylate monomers and (meth)acrylic acid monomers. In a preferred embodiment, the copolymer contains in polymerized form at least 90 weight percent (meth)acrylate monomers and (meth)acrylic acid monomers, while even more preferred is the embodiment wherein the copolymer contains in polymerized form at least 95 weight percent (meth)acrylate monomers and (meth)acrylic acid monomers.

In a highly preferred embodiment, the copolymer is a pure (meth)acrylate, or a pure (meth)acrylate except for the inclusion of a non-(meth)acrylate seed therein. These copolymers desirably consist essentially of (meth)acrylate monomers, or of (meth)acrylate monomers and (meth)acrylic acid monomers.

With reference the emulsion polymer latex, as used herein the term "(meth)acrylate monomers" is meant to include those monomers that are used to prepare the (meth)acrylate copolymers that are suitable for use in the compositions of this invention. Included therein are conventionally known acrylates, such as, for example, alkyl esters of acrylic acid, represented by the formula $CH_2=CHCOOR$, and methacrylic acid, represented by the formula $CH_2=CCH_3COOR$, where R is a hydrocarbyl or a substituted hydrocarbyl group containing from 1 to 16 carbon atoms. The term "(meth)acrylic acid monomers" is meant to include acrylic acid, methacrylic acid and substituted derivatives thereof.

With reference the emulsion polymer latex, as used herein the term "(meth)acrylate monomers" as used herein is meant also to include the monovinyl acrylate and methacrylate monomers. The (meth)acrylates can include esters, amides and substituted derivatives thereof. Generally, the preferred (meth)acrylates are $C_1$-$C_8$ alkyl acrylates and methacrylates.

Examples of suitable (meth)acrylates include methyl acrylate, ethyl acrylate, butyl acrylate, hexyl acrylate, 2-ethylhexyl acrylate, octyl acrylate and isooctyl acrylate, n-decyl acrylate, isodecyl acrylate, tert-butyl acrylate, methyl methacrylate, butyl methacrylate, hexyl methacrylate, isobutyl methacrylate, isopropyl methacrylate as well as 2-hydroxyethyl acrylate and acrylamide. The preferred (meth)acrylates are methyl acrylate, ethyl acrylate, butyl acrylate, 2-ethylhexyl acrylate, octyl acrylate, isooctyl acrylate, methyl methacrylate and butyl methacrylate. Other suitable monomers include lower alkyl acrylates and methacrylates including acrylic and methacrylic ester monomers: methyl acrylate, ethyl acrylate, n-butyl acrylate, t-butyl acrylate, 2-ethylhexyl acrylate, decyl acrylate, isobornyl acrylate, methyl methacrylate, ethyl methacrylate, n-propyl methacrylate, isopropyl methacrylate, n-butyl methacrylate, isobutyl methacrylate, sec-butyl methacrylate, cyclohexyl methacrylate, isodecyl methacrylate, isobornyl methacrylate, t-butylaminoethyl methacrylate, stearyl methacrylate, glycidyl methacrylate, dicyclopentenyl methacrylate, phenyl methacrylate.

In one embodiment, the major component comprises one or more branched vinyl esters as comonomers incorporated into (meth)acrylate polymers. Such (meth)acrylate polymers are commercially available under the tradename NEOCAR 820.

Monomers suitable for use as components in polymers are often classified as "hard" or "soft" monomers, depending upon the glass transition temperature (Tg) of the homopolymer prepared from the monomer. As used herein, a hard monomer is characterized as having a Tg greater than 40° C. for its homopolymer, while a soft monomer is characterized as having a Tg of 40° C. or less for its homopolymer. A preferred hard (meth)acrylate monomer is methyl methacrylate.

The soft non-functional (meth)acrylate monomers have the formula:

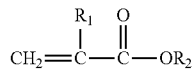

wherein $R_1$ is selected from the group consisting of hydrogen and methyl, and $R_2$ is an alkyl group, preferably having up to about 15 carbon atoms. As used herein, the term "alkyl" means cyclic and acyclic saturated hydrocarbon groups that can be either branched or unbranched. Exemplary soft, non-functional acrylic monomers include, but are not limited to, butyl acrylate, isobutyl acrylate, ethylhexyl acrylate, isodecyl methacrylate, lauryl methacrylate, tridecylmethacrylate. Butyl acrylate is a preferred soft, non-functional monomer.

Suitable non-ester monomers that are sometimes classified with the (meth)acrylates are the nitriles. A preferred nitrile monomer is acrylonitrile.

While the more highly preferred embodiment of the (meth)acrylate copolymer of the instant invention may contain up to about 5 weight percent of other comonomers that are not (meth)acrylate monomers, other embodiments may contain as other comonomers as much as 10 weight percent or even as much as 20 weight percent of monomers that are not (meth)acrylate monomers. Other monomers that are useful in these copolymers of the instant invention include vinyl aromatic monomers, aliphatic conjugated diene monomers, monoethylenically unsaturated carboxylic acid monomers, vinyl acetate monomer, vinylidene halide monomer and vinyl halide monomer. In some other desirable copolymers suitable for use in this invention, the monomers of the polymerization mixture include from 1 to 40 weight percent of one or more (meth)acrylate monomers.

As used in the specification and claims, "vinyl aromatic monomers" are defined as any organic compound containing at least one aromatic ring and at least one aliphatic-containing moiety having vinyl unsaturation. Illustrative vinyl aromatic monomers include, but are not limited to, styrene, p-methyl styrene, methyl styrene, o,p-dimethyl styrene, o,p-diethyl styrene, p-chlorostyrene, isopropyl styrene, t-butyl styrene, o-methyl-p-isopropyl styrene, o,p-dichlorostyrene, and mixtures thereof. The preferred vinyl aromatic monomers are styrene and vinyltoluene; and due to its commercial availability and low cost, styrene is the more preferred vinyl aromatic monomer.

The term "conjugated diene monomer," as used herein, is meant to include compounds such as 1,3-butadiene, isoprene, 1,3-pentadiene, 2-ethyl-1,3-butadiene, and 4-methyl-1,3-pentadiene, 2-methyl-1,3-butadiene, piperylene (1,3-pentadiene), and other hydrocarbon analogs of 1,3-butadiene. The preferred alkadiene monomer is 1,3-butadiene. Other monomers inclusive as aliphatic conjugated dienes are halogenated compounds, such as, for example, 2-chloro-1,3-butadiene.

The monomers of the vinyl group, such as, for example, "vinylidene halides" and "vinyl halides", are suitable for inclusion in the copolymer of this invention, and include, for example, vinylidene chloride and vinyl chloride, which are highly preferred. Vinylidene bromides and vinyl bromide can also be employed. Another vinyl monomer within the vinyl group is vinyl acetate.

Suitable alpha, beta-ethylenically unsaturated aliphatic carboxylic acid monomers are monoethylenically unsaturated monocarboxylic, dicarboxylic and tricarboxylic acids having the ethylenic unsaturation alpha-beta to at least one of the carboxyl groups and similar monomers having a higher number of carboxyl groups. It is understood that the carboxyl groups may be present in the acid or salt form (—COOM in which M represents a cation such as ammonium, hydrogen or a metal such as, for example, sodium or potassium) and are readily interconvertible by well known simple procedures.

Specific examples of the alpha, beta-ethylenically unsaturated aliphatic carboxylic acids are acrylic acid, methacrylic acid, fumaric acid, itaconic acid, maleic acid, aconitic acid, various alpha-substituted acrylic acids such as alpha-ethacrylic acid, alpha-propyl acrylic acid and alpha-butyl acrylic acid. Highly preferred acid monomers are acrylic acid and methacrylic acid.

With regard to the amount of acid monomer that is desirable or preferred in the copolymer as discussed above, it appears that there is a trade-off in terms of the acid strength of the monomer as indicated by pKa in aqueous solution and the amount of the acid monomer desirably included in the copolymer. While a higher acid content can be tolerated and may be desirable for relatively weak acid monomers, for those acid monomers that are relatively stronger acid monomers, the acid content of the copolymer is desirably less.

In preferred embodiments, the content of alpha, beta-ethylenically unsaturated aliphatic carboxylic acid monomers in the copolymer is desirably in the range from 0 to 4 weight percent, more preferably from 0.2 to 3 weight percent, still more preferably from 0.3 to 2 weight percent.

Within the scope of this invention are other embodiments wherein the copolymer utilized would not be classified as a (meth)acrylate copolymer. Other copolymer types that can be utilized include, for example, combinations of vinyl aromatic monomers with (meth)acrylate monomers, such as, for example, the styrene acrylates, and of vinyl aromatic monomers with conjugated diene monomers, such as, for example, styrene butadiene copolymers, and vinyl ester compounds with (meth)acrylate monomers, such as, for example, (meth)acrylate branched vinyl ester and vinyl acetate branched vinyl ester copolymers. Other copolymer types that can be utilized include, for example, vinyl acetate ethylene. These copolymers may be non-carboxylated or carboxylated.

The copolymer desirably is made, for example, by charging the monomeric ingredients, water, and a surfactant (when employed) into a reaction vessel, purging the reaction vessel with an inert gas, such as, for example, nitrogen, to remove essentially all the oxygen from the reactor vessel, and heating the reactor vessel to the reaction temperature, usually from 80° to 100° C. When the reactor vessel reaches the desired reaction temperature, an initiator and remaining monomeric ingredients are then added to the reaction vessel over time, and the reaction is continued for 2 to 4 hours. After the reaction is completed, the reactor vessel is cooled. This synthesis yields an aqueous copolymeric composition comprising the copolymer in water. In some instances, the composition has the appearance of a milky liquid, while in other instances it looks like a clear solution.

The process of production of the copolymer may include the use of a seed, which may be a (meth)acrylate, polystyrene or any other seed useful to control the ultimate particle size of the copolymer produced, or otherwise useful in the production thereof. As is well known in the art, the regulation of initial seed can be used to control the ultimate range of particle sizes of the copolymer produced. Useful copolymer particle sizes are in the range of from 700 to 10,000 angstroms.

Anionic, nonionic, and amphoteric surface active compounds, that is, surfactants, can be employed in the copolymer synthesis process. However, in some instances, no surfactant is required. Exemplary anionic, nonionic, and amphoteric surfactants are SIPONATE A246L brand surfactant available from Rhone-Poulenc, polyoxyethylene alkyl phenol surfactants, and N,N-bis-carboxyethyl lauramine, respectively. Another useful surfactant is DOWFAX 2EP, the sodium salt of dodecylated sulfonated phenyl ether, which is available from The Dow Chemical Company, Midland, Mich. 48640, U.S.A.

Forming the Inventive Coating Compositions

The method for producing the inventive coating composition comprises the steps of: (1) providing one or more molten or liquid alkyds, wherein each said one or more molten or liquid alkyds has an acid number of less than 20 and a molecular weight (MO in the range of greater than 1000 Dalton; (2) providing one or more surfactants; (3) providing water; (4) optionally providing one or more neutralizing agents; (5) continuously emulsifying said one or more molten or liquid alkyds in the water in the presence of said one or more surfactants and optionally said one or more neutralizing agents; (6) thereby producing a high internal phase emulsion; (7) providing additional water; (8) contacting said high internal phase emulsion with said additional water; (9) thereby producing said aqueous alkyd dispersion, wherein said alkyd dispersion comprises from 40 to 70 percent by weight of said one or more alkyds, from less than 10 percent by weight of said one or more surfactants, and wherein said dispersion has an average particle size diameter in the range of from 0.05 to 5 µm; (10) providing one or more second dispersions and/or second emulsions; (11) contacting said alkyd dispersion and one or more second dispersion and or second emulsions; and (12) thereby forming the coating composition.

The alkyd dispersion and the second dispersion and/or emulsion may be admixed to form the coating composition of the present invention via a continues process or a batch process. Such admixing may be achieved via, for example, stirring, Oaks mixer, IKEA mixer, or the like.

End-Use Applications of the Inventive Coating Compositions

The coating composition of the present invention may be used, for example, in different coating applications such as industrial coating applications, architectural coating applications, automotive coating applications, outdoor furniture coating applications.

The coated articles or structures according to the present invention comprise a coating layer associated with one or more surfaces of an article or a structure, wherein said coating layer is derived from the coating composition according to the present invention.

The coating compositions according to the present invention are film forming compositions. The films derived from the coating composition may have any thickness; for example, such films may have a thickness in the range of from 0.01 µm to 1 mm; or in the alternative, from 1 µm to 500 µm; or in the alternative, from 1 µm to 100 µm; or in the alternative, from 1 to 50 µm; or in the alternative, from 1 µm to 25 µm; or in the alternative, from 1 to 10 µm.

The method for coating articles or structures according to the present invention comprises the steps of (1) selecting the inventive coating composition (2) applying the coating composition to one or more surfaces of an article or a structure; (3) removing a portion of water from the coating composition associated with one or more surfaces of the article or structure; and (4) thereby coating the article or structure.

The coating composition may be applied to one or more surfaces of an article or a structure via any method. Such methods include, but are not limited to, spraying, dipping, rolling, and any other conventional technique generally known to those skilled in the art. The coating composition may be applied to one or more surfaces of an article or structure at a temperature in the range of, for example, greater than about 5° C. Such structures include, but are not limited to, commercial building, residential buildings, and warehouses. The coating composition may be used as coatings for interior applications, exterior applications, or combinations thereof. The surface of such structures to be coated with the coating composition may comprise concrete, wood, metal, plastic, glass, drywall, or the like.

In one embodiment, the coating layer according to the present invention comprises a film having a pendulum hardness in the range of from 50 to 150 seconds, wherein the film has a thickness of at least 40 μm.

In an alternative embodiment, the coating layer according to the present invention comprises a film having a modulus hardness in the range of from $(2*10^7)$ to $(1*10^{11})$ dyn/cm$^2$.

In an alternative embodiment, the coating layer according to the present invention comprises a film having a direct impact resistance in the range of from 65 to 160 inch pounds.

In an alternative embodiment, the coating layer according to the present invention comprises a film having a revers impact resistance in the range of from 20 to 160 inch pounds.

In an alternative embodiment, the coating layer according to the present invention comprises a film having a gloss loss after QUV at 60° in the range of from less than 30; for example, less than 20, less than 15, less than 10, less than 5, less than 2, or less than 1.

In an alternative embodiment the coating layer according to the present invention comprises a film having a gloss loss after QUV at 20° in the range of from less than 50; for example, less than 40, less than 30, less than 20, or less than 10.

In an alternative embodiment, the coating layer according to the present invention comprises a film having a ΔE color change after QUV in the range of from less than 8; for example, less than 5, less than 4, or less than 3.

EXAMPLES

The following examples illustrate the present invention but are not intended to limit the scope of the invention.
Alkyd Resin Synthesis The synthesis protocol used in the preparation of alkyd resins was a two-stage alcoholysis-polyesterification method.

(a) First Stage

In the first stage typical large scale alcoholysis was carried out with the product being divided up into four aliquots for the next step. To a 5 L three-neck RB flask was added sunflower oil. A glass stir rod and paddle were placed in the middle joint of the flask. The flask was attached to a lattice with overhead stirring, and an oil bath at room temperature was raised to submerge the flask. The setpoint on the bath was 220° C. and heating and stirring were started. To the stirred sunflower oil (alkyd 1) or coconut oil (alkyd 2), trimethylolpropane (TMP), pentaerythritol (PE) and dibutyltin oxide (1200 ppm on charge) were added, as reported in Table 1. Once all reactants were added a packed condenser with a set point of 95° C. was attached to one of the side joints and topped with a hosebarb adaptor that was connected to a bubbler. To the other side neck, a hosebarb adaptor was attached and connected to a nitrogen inlet. A slow nitrogen sweep was placed on the system and observed in the bubbler. The reaction mixture was allowed to heat and mix for 16 hours, typically overnight to ensure monoglyceride formation, verified by solubility in 4 parts methanol. The next day, the flask was removed from the oil bath and 900 g aliquots were transferred to individual 2 L three-neck RB flasks. The flasks were allowed to cool under a pad of N$_2$ until ready to use.

TABLE 1

| | Oil Type | Oil | TMP | PE | PIA | PAN | Benzoic Acid |
|---|---|---|---|---|---|---|---|
| Alkyd 1 | Sunflower Oil | 46.298 | 0 | 23.785 | 11.967 | 17.951 | 0 |

TABLE 1-continued

| | Oil Type | Oil | TMP | PE | PIA | PAN | Benzoic Acid |
|---|---|---|---|---|---|---|---|
| Alkyd 2 | Coconut Oil | 32.552 | 28.646 | 0 | 0 | 32.552 | 6.250 |

(b) Second Stage

The 2 L roundbottom flask (RBF) containing the alcoholysis mixture was equipped with a glass stir shaft and paddle. The flask was attached to lattice with overhead stirring. An oil bath at room temperature was raised to submerge the flask. The set point on the bath was 220° C. and heating and stirring were started. To the flask, listed components in Table 1 for Alkyd 1 and Alkyd 2, e.g. purified isophthalic acid (PIA), phthalic anhydride (PAN), benzoic acid and xylenes (2% on total charge), were added. Then, a Dean-Stark trap was connected to one of the side joints and topped with a Friedrichs condenser connected to a bubbler. To the other side joint, a hosebarb adapter was attached that was connected to the nitrogen inlet. A nitrogen sweep was placed on the system. The system was allowed to heat (~220° C.) and the water formed was distilled out as an azeotrope with xylenes. After 3 hours, 1~2 g of the reaction mixture was collected and titrated to determine the acid value (AV). The reaction was allowed to progress until the desired AV was reached, in this case AV 8-10, then the reaction contents were poured into a glass jar and allowed to cool to room temperature under a pad of nitrogen.

Alkyd Dispersion 1

Medium oil alkyd resin (Alkyd 1), acid value 7.5 mg of KOH per g of resin, was heated to 95° C. (approximately for 3 to 4 hours to form a molten state) and fed into a rotor-stator mixer at 50 g/min. 28 percent (weight/weight) ammonium hydroxide solution was fed at 0.365 g/min and blended with additional water pumped at a rate of 22.0 g/min while additional surfactant E-sperse 100 (60 percent active), (commercially available from Ethox Chemical), was pumped at a rate of 3.33 mL/min and injected into the mixer to create the high internal phase emulsion. The mixer speed was set at approximately 700 rpm. The average particle size diameter of the solid content of the emulsion was 0.17 microns. The high internal phase emulsion had a solids content of 69 weight percent. The high internal phase emulsion was later diluted by adding water at 23 g/min to the initial high internal phase emulsion; thereby forming the alkyd dispersion 1, having a solid content of 52 weight percent, a viscosity of approximately 900 cP (measured by Brookfield viscometer, spindle #2, 20 rpm, 21° C.). The alkyd dispersion had a heat age stability of at least 8 weeks, with a final particle size of 0.18 microns, and no change in solid content.

Alkyd Dispersion 2

Coconut short oil alkyd resin (Alkyd 2), acid value 9.4 mg of KOH per g of resin, was heated to 75° C. (approximately for 3 to 4 hours to form a molten state) and fed into a rotor-stator mixer at 15 g/min. 28 percent (weight/weight) ammonium hydroxide solution was fed at 0.137 g/min and blended with additional water pumped at a rate of 5.0 g/min while additional surfactant E-sperse 100 (commercially available from Ethox Chemical) (60 percent active) was pumped at a rate of 1.0 mL/min and injected into the mixer to create the high internal phase emulsion. The mixer speed was set at approximately 1300 rpm. The average particle size diameter of the solid content of the emulsion was 0.26 microns. The high internal phase emulsion had a solids content of 74 weight percent. The high internal phase emulsion was later diluted by adding water at 8 g/min to the initial high internal phase emulsion; thereby forming the alkyd dispersion 2, having a solid content of 53 weight percent, a viscosity of approximately 500 cP (measured by Brookfield viscometer, spindle #1, 20 rpm, 21° C.). The dispersion had a heat age stability of at least 8 weeks, with a final particle size of 0.30 microns, and no change in solid content.

Epoxy Dispersion 1

Epoxy Dispersion 1 is a modified bisphenol A based "1"—type solid epoxy resin dispersion, with epoxide equivalent weight of approximately 500 g/eq, a pH>6, Brookfield viscosity between 3000-9000 mPa·s at 23° C. (spindle #4, 10 rpm) and a solid content of 47%, which was provided under the tradename XZ92533.0 from The Dow Chemical Company.

Epoxy Dispersion 2

Epoxy Dispersion 2 is a modified, semi-solid epoxy novolac dispersion, with epoxide equivalent weight of approximately 200 g/eq, a pH>6, Brookfield viscosity between 5000-10000 mPa·s at 23° C. (spindle #4, 10 rpm) and a solid content of 58%, which was provided under the tradename—XZ92546.00 from The Dow Chemical Company.

Preparation of Polyolefin Dispersion 1

Polyolefin dispersion 1 was prepared according to the following procedure. Engage™ 8200 (CAS No. 26221-73-8), an ethylene-octene copolymer, with a density of 0.87 gm/cm$^3$ and a melt index of approximately 5 g/10 min (ASTM D 1238, 190 deg C./2.16 Kg), available from The Dow Chemical Company, as the base polymer, and PRIMACOR™ 5980i (CAS No. 9010-77-9), ethylene acrylic-acid copolymer having acrylic acid content of approximately in the range of 19.5 to 21.5 weight percent and a melt index of approximately 300 g/10 minutes (ASTM D 1238, 190 deg C./2.16 Kg), available from The Dow Chemical Company, as the stabilizing agent, in a ratio of 70/30, were fed into a 25 mm diameter twin screw extruder by means of a controlled rate feeder where they were forwarded and melted. The extruder temperature profile was ramped up to approximately 160° C. prior to the addition of the initial water and KOH, as the neutralizing agent, and subsequently, it was cooled back down to a temperature below 100° C. by the end of the extruder after the dilution water was added. The extruder speed was approximately 450 rpm. KOH and water were mixed together and fed to the extruder at the initial water introduction point. The dilution water was fed via a second pump, and it was introduced into the dilution zone of the extruder. The initial water and dilution water streams were optionally pre-heated to the extruder temperature. At the extruder outlet, a back-pressure regulator was used to adjust to a suitable pressure inside the extruder barrel to reduce steam formation at the operating temperature. The resulting dispersions were cooled and filtered through a 200 micron filter. A dispersion of 46.8% solid with pH of 10.2 and a particle size of 0.58 μm was prepared.

Preparation of Polyolefin Dispersion 2

Polyolefin dispersion 2 was prepared according to the following procedure. Engage™ 8407 (CAS No. 26221-73-8), an ethylene-octene copolymer, with a density of 0.87 gm/cm$^3$ and a melt index of approximately 30 g/10 min (ASTM D 1238, 190 deg C./2.16 Kg), available from The Dow Chemical Company, as the base polymer, and PRIMACOR™ 5980i (CAS No. 9010-77-9), ethylene acrylic-acid copolymer having acrylic acid content of approximately in the range of 19.5 to 21.5 weight percent and a melt index of approximately 300 g/10 minutes (ASTM D 1238, 190 deg C./2.16 Kg), available from The Dow Chemical Company, as the stabilizing agent, in a ratio of 85/15, were fed into a 25 mm diameter twin screw extruder by means of a controlled rate feeder where they were forwarded and melted. The extruder temperature profile was ramped up to approximately 160° C. prior to the addition of the initial water and KOH, as the neutralizing agent, and subsequently, it was cooled back down to a temperature below 100° C. by the end of the extruder after the dilution water was added. The extruder speed was approximately 450 rpm. KOH and water were mixed together and fed to the extruder at the initial water introduction point. The dilution water was fed via a second pump, and it was introduced into the dilution zone of the extruder. The initial water and dilution water streams were optionally pre-heated to the extruder temperature. At the extruder outlet, a back-pressure regulator was used to adjust to a suitable pressure inside the extruder barrel to reduce steam formation at the operating temperature. The resulting dispersions were cooled and filtered through a 200 micron filter. A dispersion of 47.4% solid with pH of 10.7 and a particle size of 0.39 μm was prepared.

Polyester Dispersion 1

Polyester dispersion 1 was prepared according to the following procedure. Dynapol L952, a saturated linear aromatic polyester having a Tg of approximately 70° C., a molecular weight of 18000 g/mol, an acid number of 2 mg KOH/g, and a hydroxyl number of 6 mg KOH/g, available from Evonik Industries, and Crylcoat 1510, an aromatic polyester having a Tg of approximately 58° C., a melt viscosity of 8500 Poise at 200° C., an acid number of 71 mg KOH/g, and a hydroxyl number of <2 mg KOH/g, available from Cytec, at a ratio of 80/20 by weight, were fed into a 25 mm diameter twin screw extruder by means of separate controlled rate feeders. In the extruder the polymers were melted, mixed and forwarded. The extruder temperature profile was initially set to 150° C. prior to the addition of the initial water and neutralizing agent. After the addition of initial water and neutralizing agent the temperature was lowered to 120° C. across the barrel. 2-dimethyl amino ethanol (120% neutralization) (CAS No. 108-01-0) was used as the neutralizing agent. The extruder speed was approximately 450 rpm. Amine base and initial water were mixed together and fed to the extruder at the initial water introduction point. The dilution water was fed via a second pump, and it was introduced into the dilution zone of the extruder. The initial water and dilution water streams were optionally pre-heated to the extruder temperature. At the extruder outlet, a back-pressure regulator was used to adjust to a suitable pressure inside the extruder barrel to prevent steam formation at the operating temperature. The resulting dispersions were cooled and filtered through a 200 micron filter. Polyester dispersion 1 has a solid content of 52 weight percent, a viscosity of 86 cP (measured by Brookfield viscometer, spindle #1, 20 rpm, 21° C.), pH of 7.9 and a particle size of 1 μm.

Polyester Dispersion 2

Polyester resin Fine-Tone T-382-ES, a bisphenol-A fumarate (Reichhold, acid value 21 mg of KOH per g of resin, Tg 56° C., $M_w$ 13900) was heated to 150° C. (approximately for 2 to 3 hours to form a molten state) and fed into a rotor-stator mixer at 50 g/min. 25 percent (weight/weight) dimethylethanolamine solution was fed at 3.67 g/min and blended with additional water pumped at a rate of 25.0 g/min and injected into the mixer to create the high internal phase emulsion. The mixer speed was set at approximately 750 rpm. The average particle size diameter of the solid content of the emulsion was 0.16 microns. The high internal phase emulsion had a solids content of 65 weight percent. The high internal phase emulsion was later diluted by adding water at 50 g/min to the initial high internal phase emulsion; thereby forming the polyester dispersion 2, having a solid content of 39 weight percent, a viscosity of approximately 100 cP (measured by Brookfield viscometer, spindle #1, 20 rpm, 21° C.

Polyurethane Dispersion 1

The polyurethane prepolymer resin, based on 45 parts isophorone diisocyanate, 43 parts Natural Oil Polyol, MW 850 from The Dow Chemical Company, 5 parts dimethylol propionic acid and 7 parts of UNOXOL DIOL from The Dow Chemical Company, was heated for 1 hour at 70° C., and then transferred to the feed tank of the 2 inch Oakes dispersion system. The feed tank temperature was set at 70° C. A nitrogen head pressure was placed on the feed tank. The polymer was then pumped into the system using a gear pump. The pump was set to a feed rate of 15 g/min. The polymer line and gear pump were heated to 70° C. with heat tracing. The heated polymer was introduced to the first Oakes rotor-stator mixer. The initial aqueous (IA), deionized water, was added coaxially with the polymer. The triethylamine (neutralent) was also pumped coaxially to the front face of the Oakes head using a syringe pump. The speed of the Oakes was set to 1500 rpm. The Oakes head was at 20° C.

The IA was started at a feed ratio of ~1:2 Oil:IA. The IA was then slowly lowered to increase high internal phase emulsion (HIPE) solids. As the solids level increased, the particle size became smaller as the Oil:IA ratio approached the inversion point where the system goes from an O/W emulsion to a W/O emulsion. This gradual decrease in IA allowed us to systematically lower the particle size to the desired size. The HIPE was then pumped to the second Oakes for chain extension with ethylene diamine (100% reaction with residual NCO) and dilution with DI water to the desired, 35% solids.

Polyurethane Dispersion 2

Polyurethane Dispersion 2, based on Isophorone diisocyanate and Natural Oil Polyol MW 850, QRXP1820, is available from The Dow Chemical Company.

Inventive Coating Compositions

Inventive coating compositions were prepared according to the following general formulation protocols. The alkyd dispersions 1 and 2 were blended with epoxy dispersions, polyurethane dispersions, polyolefin dispersions, and polyester dispersions, as described above, to form the inventive coating compositions.

General formulation protocols are listed below.

1. The coating composition blends comprised 70 parts by weight of the solids from first dispersion, based on the total solid content of the coating composition.
2. The coating composition blends comprised 30 parts by weight of the solids from the second dispersion, based on the total solid content of the coating composition.
3. The coating composition blends comprised 1 part by weight of butyl cellosolve, which is commercially available from The Dow Chemical Company, based on 100 parts of solid content of the coating composition (Solid Content=Component 1+Component 2).
4. The coating composition blends comprised 0.2 part Surfynol 104 from Air Products, based on 100 parts of solid content of the coating composition (Solid Content=Component 1+Component 2).
5. The coating composition blends comprised 0.1 part Halox Flash-X from Halox, based on 100 parts of solid content of the coating composition (Solid Content=Component 1+Component 2).
6. The coating composition blends comprised 0.1 part Acrysol RM 825 from The Dow Chemical Company, based on 100 parts of solid content of the coating composition (Solid Content=Component 1+Component 2).

Additional Components

Drier formulation used for alkyd dispersion 1 formulations is a 1% Co Hydrocure II from OMG, 2.2% Zr HydroCEM from OMG, 0.26% Dri-RX HF from OMG, based on total dispersion solid.

Cymel 303 is available from Cytec, which is used for alkyd dispersion 2 formulations. 80 parts of alkyd dispersion 2 (based on solid content) is formulated with 20 parts Cymel 303 (based on solid content).

Anquamine 401 is available from Air Products, which is used to crosslink epoxy dispersion formulations 1 and 2. Amine:Epoxy ratio is 1.2:1.

Inventive Examples 1-15 and Comparative Examples 1-5

Inventive examples 1-15 were prepared and tested for the following properties: (A) Modulus and Hardness, (B) Impact Resistance, (C) Solvent Resistance, (D) Gloss and Color Retention after Exposure to QUV, and (E) Improvement of Corrosion Resistance.

A. Modulus and Hardness

Inventive examples 1-4 were prepared according to the following formulations: Inventive example 1 is a blend of 70/30 of alkyd dispersion 1 and polyurethane dispersion 1. Inventive example 2 is a blend of 70/30 of alkyd dispersion 1 and polyurethane dispersion 2. Inventive example 3 is a blend of 70/30 of alkyd dispersion 1 and polyester dispersion 1.

Inventive example 4 is a blend of 70/30 of alkyd dispersion 1 and polyester dispersion 2.

Comparative example 1 is alkyd dispersion 1.

Inventive Examples 1-4 and Comparative Example 1 were tested for modulus and hardness, and the results are reported in Table 2 and below.

TABLE 2

| Sample | MFFT | Average Pendulum Hardness (sec) | Average Thickness (um) |
|---|---|---|---|
| Inventive example 1 | <−5 | 74 | 44 |
| Inventive example 2 | <−5 | 60 | 46 |
| Inventive example 3 | <−5 | 52 | 51 |
| Inventive example 4 | <−5 | 67 | 52 |
| Comparative example 1 | <−5 | 46 | 49 |

The moduli of Inventive Examples 1 and 2 at room temperature are $4 \times 10^8$ and $3 \times 10^8$ dyn/sq cm, respectively. The moduli of Inventive Examples 3 and 4 at room temperature are $4.2 \times 10^8$ and $5.6 \times 10^8$ dyn/sq cm, respectively. The moduli of Comparative Example 1 at room temperature is at $1.8 \times 10^7$ dyn/sq cm.

B. Impact Resistance

Inventive examples 5-6 were prepared according to the following formulations: Inventive Example 5 is a blend of 70/30 of alkyd dispersion 1 and polyolefin dispersion 1. Inventive Example 6 is a blend of 70/30 of alkyd dispersion 1 and polyolefin dispersion 2.

Comparative Example 1 is alkyd dispersion 1.

TABLE 3

| Sample | Average Thickness (um) | Impact Direct (in * lbs) | Impact reverse (in * lbs) | Adhesion (ASTM) | Mandral (mm) |
|---|---|---|---|---|---|
| Inventive example 5 | 48 | 120 | 20 | 5B | Pass |
| Inventive example 6 | 58 | 100 | 20 | 5B | Pass |
| Comparative example 1 | 49 | 60 | <20 | 5B | Pass |

C. Chemical Resistance

Inventive example 7 was prepared according to the following formulations: Inventive example 7 is a blend of 70/30 of polyurethane dispersion 1 and alkyd dispersion 1. Comparative Example 1 is alkyd dispersion 1.

Comparative Example 2 is polyurethane dispersion 1.

Inventive Example 7 and Comparative Examples 1 and 2 were tested for chemical resistance, and the results are reported in Table 4.

TABLE 4

| Sample ID | Water | Bleach | Ammonia | 50% EtOH | 409 | Motor Oil |
|---|---|---|---|---|---|---|
| Inventive example 7 | 5 | 5 | 5 | 5 | 3 | 5 |
| Comparative example 1 | 3 | 5 | 3 | 2 | 3 | 5 |
| Comparative example 2 | 5 | 5 | 5 | 1 | 1 | 5 |

D. Gloss and Color Retention after Exposure to QUV

Inventive Example 8 was prepared according to the following formulations:

Inventive Example 8 is a blend of 70/30 of epoxy dispersion 1 and alkyd dispersion 2.

Comparative Example 3 is epoxy dispersion 1.

Inventive Example 8 and Comparative Example 3 were tested for gloss and color retention after exposure to QUV, and the results are reported in Table 5.

TABLE 5

| Sample | Gloss 20 Loss % | Gloss 60 Loss % |
|---|---|---|
| Inventive example 8 | 8.21 | 0.93 |
| Comparative example 3 | 61.36 | 30.37 |

Inventive Examples 9 and 10 were prepared according to the following formulations:

Inventive Example 9 is a blend of 70/30 of alkyd dispersion 1 and polyurethane dispersion 1.

Inventive Example 10 is a blend of 70/30 of alkyd dispersion 1 and polyurethane dispersion 2.

Comparative Example 1 is alkyd dispersion 1.

Inventive Examples 9 and 10 and Comparative Example 1 were tested for color retention, and the results are reported in Table 6, and FIG. 1. Referring to FIG. 1, Inventive Example 9 is designated as 3, Inventive Example 10 is designated as 4, and Comparative Example 1 is designated as 73.

TABLE 6

| Sample | Color Difference ΔE |
|---|---|
| Inventive example 9 | 7.67 |
| Inventive example 10 | 7.30 |
| Comparative example 1 | 9.72 |

E. Improvement of Corrosion Resistance

Inventive Example 11 was prepared according to the following formulations: Inventive Example 11 is a blend of 70/30 of polyurethane dispersion 2 and alkyd dispersion 1. Comparative Example 1 is alkyd dispersion 1.

Comparative Example 4 is polyurethane dispersion 2.

Inventive Example 11 and Comparative Examples 1 and 4 were tested for corrosion resistance, and the results are reported in Table 7.

Referring to Table 7, blister is rated as vF (very few), F (few), M (medium), MD (medium dense) and the number refers to the size of the blister. Rust is rated as sl (slight), med (medium), hvy (heavy) and the number refers to the area of the rust and undercut refers to the distance of penetration of the rust beneath the scoring.

TABLE 7

| | 20 hrs salt spray blister | rust | undercut (mm) |
|---|---|---|---|
| Inventive Example 11 | 7-9F | sl 6% | 2 |
| Comparative example 1 | 9MD | Sl 4% | 1 |
| Comparative example 4 | 6F | med 15% | 5 |

Inventive Example 12 was prepared according to the following formulations:

Inventive Example 12 is a blend of 70/30 of polyolefin dispersion 2 and alkyd dispersion 1.

Comparative Example 1 is alkyd dispersion 1.

Comparative Example 5 is polyolefin dispersion 2.

Inventive Example 12 and Comparative Examples 1 and 5 were tested for blister, rust, and undercut, and the results are reported in Table 8.

TABLE 8

| | 20 hrs salt spray blister | rust | undercut (mm) |
|---|---|---|---|
| Inventive example 12 | 9F | med 20% | 1 |
| Comparative example 1 | 9MD | Sl 4% | 1 |
| Comparative example 5 | 6F | hvy 60% | 1 |

Inventive Examples 13 and 14 were prepared according to the following formulations:

Inventive Example 13 is a blend of 70/30 of alkyd dispersion 2 and epoxy dispersion 1.

Inventive Example 14 is a blend of 70/30 of alkyd dispersion 2 and epoxy dispersion 2.

Comparative Example 1A is alkyd dispersion 2.

Figure 2:
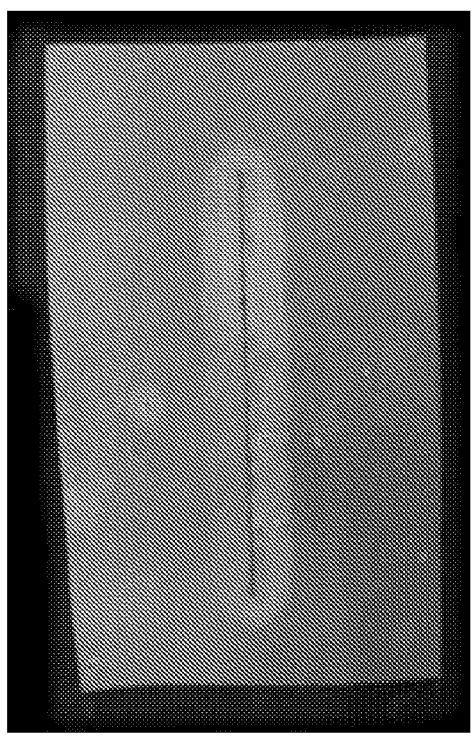
FIG. 2 is a photograph illustrating corrosion resistance after salt fog testing of Inventive Example 13 designated as 9D, and Inventive Example 14 designated as 10D.
Figure 2:
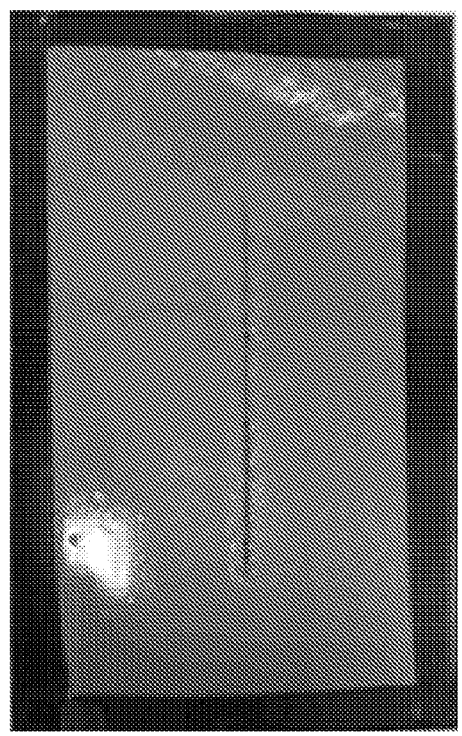

Inventive Examples 13 and 14 and Comparative Example 1A were tested for blister, rust, and undercut, and the results are reported in Table 9. Comparative Example 1A did not form a film, so no properties were tested. Referring to FIG. 2, Inventive Example 13 is designated as 9D and Inventive Example 14 is designated as 10D.

TABLE 9

| | 20 hrs salt spray blister | rust | under-cut (mm) | 48 hrs salt spray blister | rust | under-cut (mm) | comments |
|---|---|---|---|---|---|---|---|
| Inventive Example 13 | 9 vF | sl 8% | 5 | 9 vF | sl 8% | 10 | tarnished appearance |
| Inventive example 14 | 9 F | sl 5% | 3 | 9 F | sl 5% | 6 | — |

Inventive Example 15 was prepared according to the following formulations:

Inventive Example 15 is a blend of 70/30 of epoxy dispersion 1 and alkyd dispersion 1.

Comparative Example 1 is alkyd dispersion 1.

Comparative Example 3 is epoxy dispersion 1.

Inventive Example 15 and Comparative Examples 1 and 3 were tested for blister, rust, and undercut, and the results are reported in Table 10.

TABLE 10

| | 20 hrs salt spray blister | rust | under-cut (mm) | 48 hrs salt spray blister | rust | under-cut (mm) | comments |
|---|---|---|---|---|---|---|---|
| Inventive example 15 | 9 F | sl 5% | 1 | 7-9 M | med 15% | 2 | — |
| Comparative example 1 | 9 MD | Sl 4% | 1 | 9 MD | Sl 5% | 1 | Tarnished appearance |
| Comparative example 3 | 9 vF | sl 5% | 3 | 9 vF | sl 5% | 2 | tarnished appearance |

Test Methods

Test methods include the following:

Minimum Film Formation Temperature

Minimum film formation temperature was measured according to ASTM-D 2354-91

Pendulum Hardness

Pendulum hardness was measured using a Pendulum Hardness Tester from BYK Gardner equipped with a König pendulum. The tester was run according to ISO 1522 and set to measure hardness in seconds. This method evaluates hardness by measuring the damping time in seconds of an oscillating pendulum as its amplitude decreases from 6° to 3°. The pendulum rests with 2 stainless steel balls, 5 mm in diameter, on the coating surface. When the pendulum is set into motion, the balls roll on the surface and put pressure on the coating. Depending on the elasticity of the coating, the damping will be stronger or weaker. If there are no elastic forces, the pendulum will damp stronger. High elasticity will cause weak damping. In other words, the amplitude of the pendulum oscillations decreases more rapidly with softer coatings resulting in shorter damping times.

Film Thickness

Film thickness was measured via a Gardner micro TRI-gloss meter is used.

Impact Resistance

The impact tester is used to test coatings for crack formation, breaking off, adhesion and elasticity. Heavy duty impact tester PF-1120 from BYK-Gardner or equivalent is used. A metal coated sample is placed with coating side up underneath the equipment anvil. A four pound punch is raised to the highest point in the guide tube which is equivalent to 160 inch·pounds and released. The punch hits the anvil and an indent is formed in the panel which is a concave deformation. The panel is removed and observed to see if there was coating damage. Good lighting and a magnifying glass may be helpful to see damage around the outside diameter of the indent. Rings are the most common defect seen; sometimes the coating delaminates from the metal panel and cracks or flakes off. These are considered failures so the test is repeated again with a lower drop level until three consecutive drops at a given distance show no sign of failure. The distance marked on the guide tube is the equivalent inch·pounds based on the four pound weight. With the impact coming in direct contact with the coating surface the direction and value is reported as direct impact resistance in inch·pounds.

Reverse or Indirect Impact

Reverse or indirect impact is also tested. The panel is impacted with the coating side down, thus producing a bulge in the panel. The panel is then removed and the coating side is observed for damage. The most common failure is starburst cracking or delaminating and flaking off. If there is a failure the test is repeated again with a lower drop level until three consecutive drops at a given distance show no signs of failure. The value is reported as either reverse or indirect impact resistance in inch·pounds.

Chemical Resistance

Chemical and stain resistance of the cured coatings was tested by exposing the coatings to various chemicals, according to ASTM-D 1308. The list of chemicals that may be included: deionized water, 50% ethyl alcohol in water, bleach, household ammonia, 409 and olive oil. Several drops of each chemical were placed on the coating and covered with a watch glass for 24 hours before evaluation. Filter paper, 1 inch diameter, was used to prevent initial wicking of liquid in some samples. After 24 hours, the chemicals were washed away with water and the panels were dried with paper towels. After 1 hr. coatings were visually inspected for any signs of chemical attack or staining and were ranked on a 1-5 scale, from 5 (no effect) through 1 (coating failure).

QUV

QUV was measured according to ASTM-D 4587, Standard Practice for Light/Water Exposure of Paint Corrosion Resistance Corrosion resistance was measured according to ASTM-B 117-09 Standard Practice for Operating Salt Spray (Fog) Apparatus.

Acid Value Determination

A 1~2 g sample of alkyd was removed from the reactor using a glass pipette and weighed into a 250 mL Erlenmeyer flask. To the flask, 25 mL of 50/50 isopropanol/xylenes mixture was added along with a stir bar. The flask was placed on a stirrer/hot plate and allowed to mix with gentle heating until the material was dissolved. Then, a few drops of phenolphthalein indicator solution were added to the flask and the contents titrated to the phenolphthalein endpoint using 0.1N potassium hydroxide in methanol. The AV was then calculated according to the following formula:

$$AV = \frac{\text{mL titrant} \times 56.1 \times \text{normality of titrant}}{\text{sample weight in grams}}$$

Average volume particle size diameter may be measured via light scattering using a particle size analyzer or by electron microscopy using Transmission Electron Microscopy (TEM) or Scanning Electron Microscopy (SEM).

Particle Size Analyzer

A Beckman Coulter LS230 particle size analyzer was used with a Small Volume Module as the sample delivery system. The software version utilized was Version 3.29. Hardware and software were obtained from Beckman Coulter Inc., Miami, Fla.

The analysis conditions for all measurements used a fluid refractive index of 1.332, a sample real refractive index of 1.5, and a sample imaginary refractive index of 0.0. The extended optical model was not employed. The polarization intensity differential scattering (PIDS) option was activated and used to generate the particle size information. The average particle size diameter was measured and reported in μm.

Electron Microscopy (1) TEM

The samples are first diluted with distilled water (1 drop latex to 10 mL of D.I. water) then a ~5 μL drop is placed onto a Formvar (polyvinyl formal) coated TEM grid and allowed to air dry. The samples are examined with a JEOL JEM-1230 TEM operating at an accelerating voltage of 120 kV using either the standard specimen holder or using the cryo-stage at −120° C. Digital images are acquired with a Gatan Multiscan 794 CCD camera with a resolution of 1024×1024 pixels and processed with Adobe Photoshop 5.0. Image analysis is done using ImageJ software. A threshold is applied to gray-scale images, agglomerates are separated using a watershed function, and particle areas are measured. Particle areas are converted to equivalent diameters via the equation diameter=2*sqrt(Area/π). Particles with a diameter ranging from ~3 nm to 3 μm can be measured by TEM techniques.

(2) SEM

The samples are diluted with deionized water, and then are dropped onto a fragment of clean silicon wafer and dried at room temperature. After they are sputter coated with 10 nm of osmium they are imaged in an FEI Nova NanoSEM field emission gun scanning electron microscope at 3 to 5 keV. Image analysis is done using ImageJ software. A threshold is applied to gray-scale images, agglomerates are separated using a watershed function, and particle areas are measured. Areas were converted to diameters via the equation diameter=2*sqrt(Area/π). Diameters ~50 nm to 50 μm can be measured.

Viscosity may be measured via Brookfield viscometer, at 20 rpm and 21° C.

Viscosity of Alkyd Resins in the Melt

Viscosity measurements of the alkyd polymer were taken using a TA Instruments AR 2000 rheometer. A sample of alkyd polymer is analyzed by flow rheometry using parallel plate geometry at a specified temperature. Viscosity is calculated from measured torque and is based on calibrated instrumental factors specific to test geometry, and the measured shear rate of 0.10/sec.

Heat Age Stability is determined by re-measuring (after a specified temperature and time cycle) the particle size and solids content of the dispersion to determine if a change has occurred. The dispersion samples were placed in a glass jar with a plastic lid. The jar was placed inside an oven set at a temperature of 50° C. and allowed to sit for up to 12 weeks. At the end of the time period, if no settling/separation of the dispersion was visible to the eye, the particle sizes of the samples were re-measured using the same procedure as outlined previously.

The present invention may be embodied in other forms without departing from the spirit and the essential attributes thereof, and, accordingly, reference should be made to the appended claims, rather than to the foregoing specification, as indicating the scope of the invention.

We claim:

1. A coating composition comprising:
(a) from 60 to 80 percent by weight based on the total weight of the coating composition of an aqueous, high-solid, solvent-free alkyd dispersion comprising:
from 40 to 70 percent by weight of one or more alkyds based on the total weight of the dispersion, wherein each said one or more alkyds has an acid value of less than 20, a viscosity equal to or greater than 15,000 cP at 80° C. and 0.1/sec and a molecular weight ($M_n$) in the range of greater than 1000 Dalton;
from more than 0 to less than 10 percent by weight of one or more surfactants, based on the total weight of the dispersion; and
from 30 to 55 percent by weight of water, based on the total weight of the dispersion;
wherein said aqueous, high-solid, solvent-free alkyd dispersion has an average particle size diameter in the range of from 0.05 to 5 μm;
and
(b) from 20 to 40 percent by weight an aqueous polyolefin dispersion comprising the melt blending product of a thermoplastic base polymer and a stabilizing agent in the presence of water and optionally a neutralizing agent, based on the total weight of the coating composition;
wherein said coating composition has a solid content of in the range of from 25 to 65 percent by weight of solid content, based on the total weight of the coating composition, and the coating composition has a pH in the range of from 7 to 11, and wherein the coating composition has a volume average particle size in the range of from 0.03 to 5 μm, and wherein the coating composition has a viscosity in the range of from 100 to 10,000 cP.

2. The coating composition according claim 1, wherein said one or more alkyds are neutralized up to 100 percent by a neutralizing agent.

3. The coating composition according claim 1, wherein said one or more alkyds are neutralized up to 200 percent by a neutralizing agent.

4. One or more coating layers derived from the coating composition of claim 1.

5. An article comprising one or more coating layers derived from a coating composition of claim 1.

6. The coating composition of claim 1, wherein said alkyd dispersion has a solid content of greater than 60 weight percent, based on the weight of the alkyd dispersion.

* * * * *